(12) United States Patent
Sue et al.

(10) Patent No.: US 8,572,318 B2
(45) Date of Patent: Oct. 29, 2013

(54) METHOD AND SYSTEM FOR DISTRIBUTING MULTIPLE STORAGE DEVICES TO MULTIPLE TIERS IN A STORAGE APPARATUS

(75) Inventors: Hirohito Sue, Yokohama (JP); Nobuyoshi Sakai, Zushi (JP); Takuya Ono, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 13/055,125

(22) PCT Filed: Sep. 24, 2010

(86) PCT No.: PCT/JP2010/066585
§ 371 (c)(1),
(2), (4) Date: Jan. 20, 2011

(87) PCT Pub. No.: WO2012/039062
PCT Pub. Date: Mar. 29, 2012

(65) Prior Publication Data
US 2012/0079193 A1 Mar. 29, 2012

(51) Int. Cl.
*G06F 12/00* (2006.01)
(52) U.S. Cl.
USPC .......................................... 711/117; 711/170
(58) Field of Classification Search
USPC .................................. 711/117, 170
See application file for complete search history.

(56) References Cited

U.S. PATENT DOCUMENTS

| | | | |
|---|---|---|---|
| 2006/0047909 A1 | 3/2006 | Takahashi et al. | |
| 2006/0047930 A1 | 3/2006 | Takahashi et al. | |
| 2006/0143418 A1 | 6/2006 | Takahashi et al. | |
| 2008/0091898 A1 | 4/2008 | Takahashi et al. | |
| 2008/0201542 A1 | 8/2008 | Maruyama et al. | |
| 2008/0244183 A1* | 10/2008 | Ishikawa et al. | 711/129 |
| 2009/0300285 A1 | 12/2009 | Nagai et al. | |
| 2012/0246403 A1* | 9/2012 | McHale et al. | 711/114 |

FOREIGN PATENT DOCUMENTS

| | | |
|---|---|---|
| EP | 1 630 658 A1 | 3/2006 |
| EP | 1 770 493 A2 | 4/2007 |
| JP | 2007-109262 A | 8/2004 |
| JP | 2006-099748 A | 4/2006 |
| JP | 2007-066259 A | 3/2007 |
| JP | 2008-047156 A | 2/2008 |
| JP | 2008-203937 A | 9/2008 |

OTHER PUBLICATIONS

Translation of Written Opinion of the International Searching Authority issued on Nov. 9, 2010 in PCT/JP2010/066585, 1 page.
Written Opinion of the International Searching Authority issued on Nov. 9, 2010 in PCT/JP2010/066585, 5 pages.

* cited by examiner

*Primary Examiner* — John Lane
(74) *Attorney, Agent, or Firm* — Foley & Lardner LLP

(57) ABSTRACT

A management system of a storage apparatus, which exercises control so as to arrange data in a storage device of a certain tier of multiple tiers, carries out a first tier definition process (a process for distributing multiple storage devices to multiple tiers based on respective storage device types of the multiple storage devices and type/tier information that denotes the corresponding relationship between multiple storage device types and multiple tiers). Subsequent to the first tier definition process, the management system acquires performance information denoting the performance of a storage device for each of the multiple storage devices. The management system carries out a second tier definition process (a process for distributing the multiple storage devices to the multiple tiers based on the performance information of multiple storage devices such that two or more storage devices of similar performance are distributed to the same tier).

20 Claims, 29 Drawing Sheets

FIG. 7

| RANKING | TYPE |
|---|---|
| 1 | SSD |
| 2 | SAS |
| 3 | SATA |
| 4 | Unknown |

| TYPE | TIER |
|---|---|
| SSD | Tier0 |
| SAS | Tier1 |
| SATA | Tier2 |
| Unknown | Tier3 |

| LU | TYPE |
|---|---|
| LU1 | SSD |
| LU2 | SSD |
| LU3 | SSD |
| LU4 | SSD |
| LU5 | SAS |
| LU6 | Unknown |
| LU7 | SATA |
| LU8 | SATA |
| LU9 | Unknown |

| LU | TIER |
|---|---|
| LU1 | Tier0 |
| LU2 | Tier0 |
| LU3 | Tier1 |
| LU4 | Tier1 |
| LU5 | Tier1 |
| LU6 | Tier2 |
| LU7 | Tier2 |
| LU8 | Tier3 |
| LU9 | Tier3 |

| LU | IOPS | Response Time |
|---|---|---|
| LU1 | 250K | 0.20μSec |
| LU2 | — | — |
| LU3 | 200K | 0.2μSec |
| LU4 | 215K | 0.3μSec |
| LU5 | 150K | 0.4μSec |
| LU6 | 125K | 0.6μSec |
| LU7 | — | — |
| LU8 | 100K | 0.5μSec |
| LU9 | 75K | 0.8μSec |

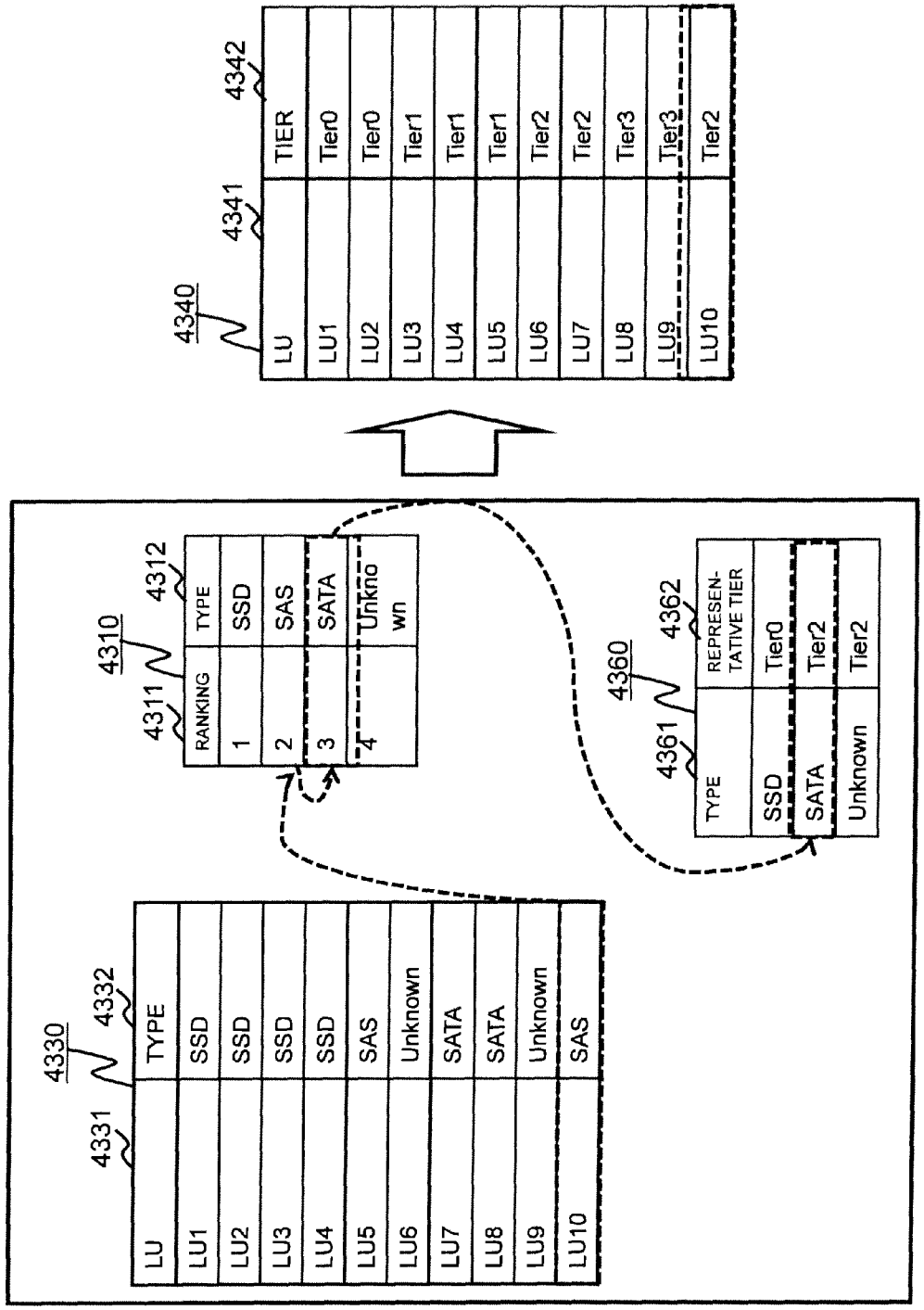

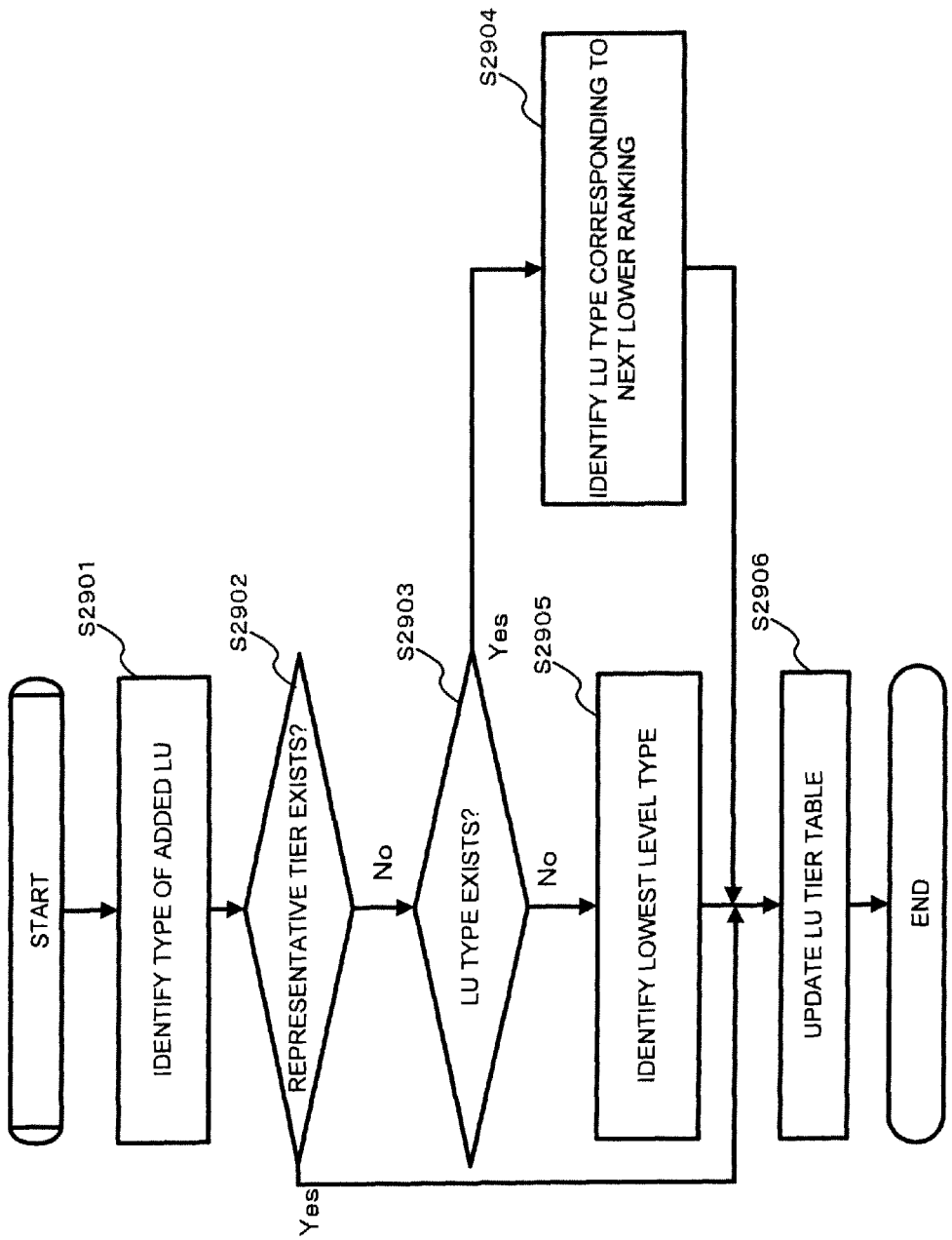

METHOD AND SYSTEM FOR DISTRIBUTING MULTIPLE STORAGE DEVICES TO MULTIPLE TIERS IN A STORAGE APPARATUS

TECHNICAL FIELD

The present invention relates to technology for distributing multiple storage devices to multiple tiers in a storage apparatus.

BACKGROUND ART

A hierarchized storage apparatus, which comprises multiple types of physical storage devices with different performance and so forth, has been known for some time.

For example, in Patent Literature 1, there is disclosed a method (a method for carrying out a volume migration) for an administrator to distribute multiple different types of logical units (hereinafter called LU) to multiple tiers, and to migrate data from a LU of a certain tier to a LU of a different tier in accordance with a data I/O (Input/Output) frequency (the LU may be called a "logical volume" or simply a "volume"). According to a volume migration that conforms to the Patent Literature 1, data with a high I/O frequency is migrated from a first LU, which is storing this data, to a second LU (a LU that belongs to a tier of a higher level than the tier to which the first LU belongs) based on an expensive physical storage device that features high performance and reliability. Alternatively, data with a low I/O frequency is migrated from a third LU, which is storing this data, to a fourth LU (a LU that belongs to a tier at a lower level than the tier to which the third LU belongs) based on an inexpensive physical storage device that features low performance and reliability.

Furthermore, for example, in Patent Literature 2, there is disclosed a method for carrying out a page migration. The Patent Literature 2 discloses the following. That is, there is a virtual LU (hereinafter the TP-LU) that conforms to Thin Provisioning. There is a hierarchized pool that comprises multiple types of LU. Each LU comprising the pool is partitioned into multiple pages (storage areas), and as such, the pool comprises multiple pages. A page is allocated to a TP-LU write-destination virtual area, and write-target data is written to the page. The data in the pool is reallocated in accordance with the data I/O frequency. Specifically, data with a high I/O frequency is migrated from a first page, which is storing this data, to a second page, which is in a higher tier than the tier of the first page. Alternately, data with a low I/O frequency is migrated from a third page, which is storing this data, to a fourth page that is in a lower tier than the tier of the third page.

CITATION LIST

Patent Literature

[PTL 1]
US Patent Application Publication No. 2008/0091898
[PTL 2]
Japanese Patent Application Laid-open No. 2007-066259

SUMMARY OF INVENTION

Technical Problem

Now then, in order to more efficiently carry out a data migration (for example, either a data migration in volume units as disclosed in the Patent Literature 1, or a data migration in page units as disclosed in the Patent Literature 2), the LUs must be distributed to appropriate tiers. To distribute LUs to appropriate tiers, it is necessary to define the tiers appropriately so as to distribute a LU based on a high-performance physical storage device (that is, a high-performance LU) to a higher-level tier, and to distribute a LU based on a low-performance physical storage device (that is, a low-performance LU) to a lower-level tier. Generally speaking, LU performance can be defined based on the initial information of the physical storage device that constitutes the basis of this LU. The initial information of a physical storage device, for example, is the following information:

(*) information denoting the type of this physical storage device;
(*) information denoting the RAID (Redundant Array of Independent (or Inexpensive) Disks) level of the RAID group comprising this physical storage device, and the number of physical storage devices comprising this RAID group; and
(*) information denoting whether or not the physical storage device is a new type.

However, there are cases where in is not possible to accurately determine LU performance. The two cases below, for example, are examples of such cases.

(Case 1) The LU performance may change depending on the I/O status of a storage apparatus while the storage apparatus is in operation. For this reason, it is not possible to determine the precise performance of a LU simply using the initial information of the physical storage device that constitutes the basis of the LU, thereby making it impossible to appropriately define the tiers.

(Case 2) A storage apparatus may be coupled to another storage apparatus (hereinafter, the external storage apparatus), and a first LU based on a second LU of the external storage apparatus may be defined in the storage apparatus in accordance with storage virtualization technology. In this case, the storage apparatus is unable to determine the performance of the second LU, thereby making it impossible to determine the performance of the first LU. Furthermore, even in a case where the performance of the second LU has been determined, it is impossible to accurately determine the performance of the first LU. This is because, in a case where the storage apparatus has received an I/O command specifying the first LU from a host apparatus, the storage apparatus must communicate with the external storage apparatus, and this communication causes a drop in performance.

An object of the present invention is to distribute storage devices to appropriate tiers in a storage apparatus.

Further objects of the present invention should become clear from the following description.

Solution to Problem

A management system of a storage apparatus, which exercises control so as to arrange data in a storage device of a certain tier of multiple tiers, carries out a first tier definition process (a process for distributing multiple storage devices to multiple tiers based on the respective storage device types of the multiple storage devices and type/tier information that denotes the corresponding relationship between multiple storage device types and multiple tiers). The management system, subsequent to the first tier definition process, acquires performance information denoting the performance of a storage device for each of the multiple storage devices. The management system carries out a second tier definition process (a process for distributing multiple storage devices to multiple tiers based on the performance information of the multiple storage devices such that two or more storage devices of similar performance are distributed to the same tier)

The storage device is either a logical unit (LU), which will be explained hereinbelow, or a RAID group.

Furthermore, the performance of the storage device, for example, is the performance (for example, the frequency at which I/O commands are issued or a response time) related to an I/O command from a host computer (for example, a business server, which will described further below) of the storage apparatus. The I/O command may be a command for inputting/outputting data with respect to the LU, or may be a dummy I/O command (a test command) that is issued for measuring performance.

Furthermore, "distribute a storage device to a tier" refers to associating a storage device to a tier. In accordance with this process, the storage apparatus is able to discern which storage devices belong to which tiers.

BRIEF DESCRIPTION OF DRAWINGS

FIG. 7 shows the configuration of a by-type performance ranking list 4310.

FIG. 8 shows the configuration of a by-type tier list 4320.

FIG. 9 shows the configuration of a LU tier table 4330.

FIG. 10 shows the configuration of a LU type table 4340.

FIG. 11 shows the configuration of a performance information table 4350.

FIG. 28 is a schematic diagram of a second tier redefinition process that is not based on LU performance.

FIG. 29 is a flowchart of the processing for defining an additional tier.

DESCRIPTION OF EMBODIMENTS

Figure 1:
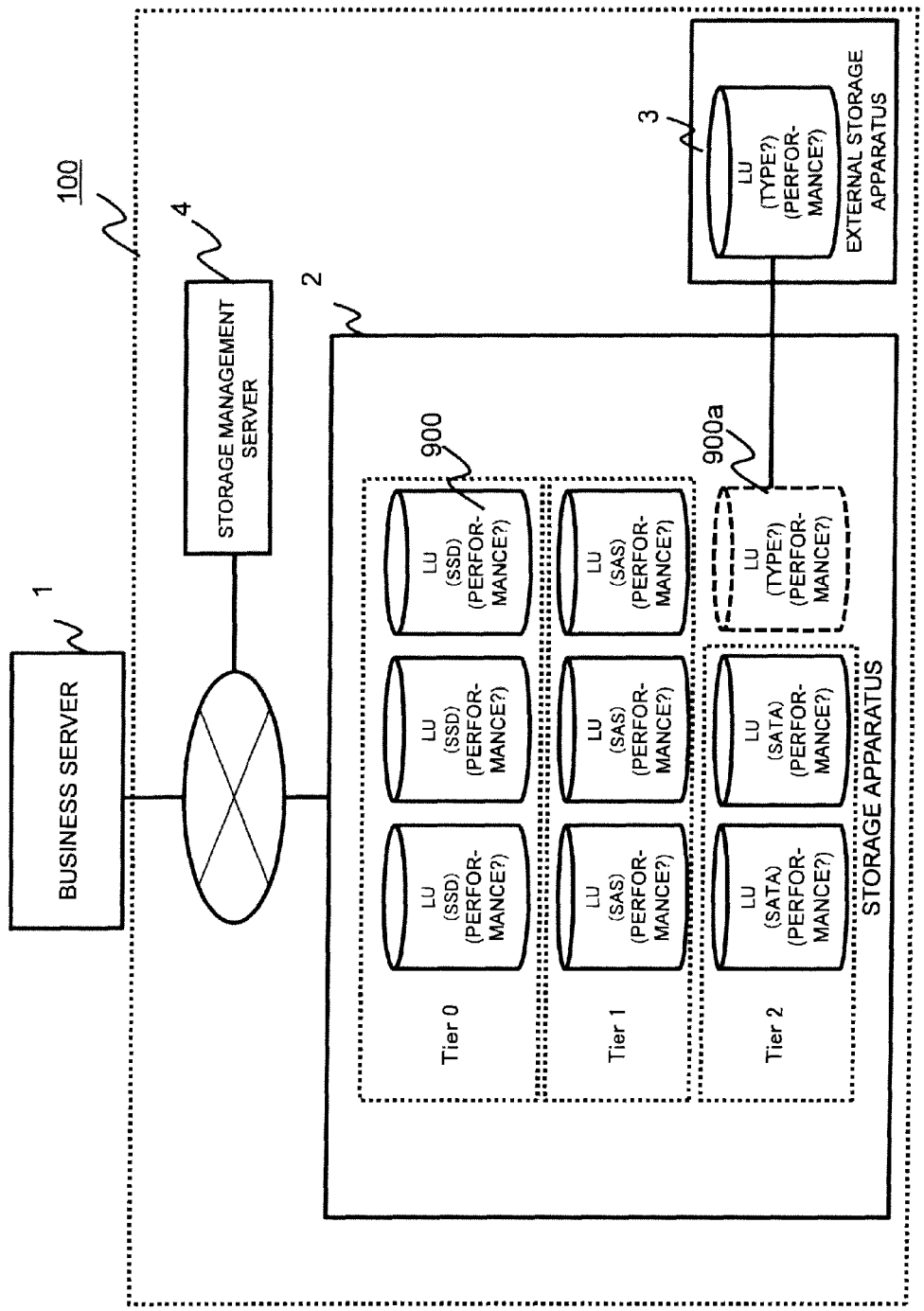
FIG. 1 is a schematic diagram of a first tier definition process related to one embodiment of the present invention.

In the following explanation, various types of information may be explained using the expression "xxx table", but the various information may also be expressed using a data structure other than a table. Also, "xxx table" may be called "xxx information" to show that the various information is not dependent on the data structure.

Furthermore, in the following explanation, there may be cases where the processing is explained using a "program" as the subject, but since the stipulated processing may be performed in accordance with a program being executed by a processor (for example, a CPU (Central Processing Unit)) while using a storage resource (for example, a memory) and/or a communication interface (for example, a communication port) as needed, the processor may also be used as the subject of the processing. Processing explained using the program as the subject may be processing carried out by the processor or a system comprising this processor (for example, a storage apparatus or a management system (for example, either a display computer or a storage management server)). Furthermore, the processor may be the CPU itself or may comprise a hardware circuit that carries out either part or all of the processing performed by the processor. A program may be installed in respective controllers from a program source. The program source, for example, may be either a program delivery server or a storage medium. The program delivery server may be a management computer.

Furthermore, the management system may comprise one or more computers. Specifically, for example, in a case where either a management computer displays information or the management computer (for example, a storage management server) sends display information to a remote computer, the management computer is the management system. Also, for example, in a case where functions equivalent to those of the management computer are realized using multiple computers, the relevant multiple computers (may include a display computer in a case where a computer for display use carries out displays) are the management system.

Furthermore, in the following explanation, a number, an identifier, or a name will be used as the type of identification information for various targets (for example, a logical unit and a tier), but these may be interchangeable, or a combination of multiple types of identification information may be the identification information.

An overview of one embodiment of the present invention will be explained below by referring to FIGS. 1 through 3. Furthermore, in the following explanation, a logical unit (LU) is used as an example of a storage device, which belongs to a storage apparatus and which is distributed to a tier in the storage apparatus. However, a storage device, which is distributed to a tier, may be a physical storage device group (one or more physical storage devices) that constitutes the basis of the LU either instead of or in addition to the LU (that is, the logical storage device). The physical storage device group, for example, may be a RAID group comprising multiple physical storage devices.

FIG. 1 is a schematic diagram of a first tier definition process related to one embodiment of the present invention.

A storage system 100 related to this embodiment comprises a storage apparatus 2 and a storage management server 4. The storage apparatus 2 is coupled to a business server 1, and comprises multiple LUs in which data from the business server 1 is stored. The LUs are distributed to any of multiple tiers in the storage apparatus 2.

The storage management server 4 is an apparatus for carrying out tier management as to which tiers respective multiple LUs are distributed. In LU tier management, multiple tiers are defined, a high-performance LU is distributed to a higher-level tier, and a low-performance LU is distributed to a lower-level tier. In accordance with this, data with a high I/O frequency is stored in a LU that belongs to a higher-level tier, and data with a low I/O frequency is stored in a LU that belongs to a lower-level tier.

The storage management server 4 can carry out a first through a fourth tier definition process and an additional tier definition process. The first tier definition process is carried out for defining a first tier in the storage apparatus 2, and any of the second through the fourth tier definition processes is carried out in processing that is performed regularly (or irregularly) subsequent to the first tier definition process.

In the following explanation, the performance and type of an LU are used as LU attributes, but LU attributes are a function of the attributes (for example, the performance, type, and so forth) of the physical storage device related to the physical storage area to which this LU is allocated. The "physical storage area to which a LU is allocated", in a case where the LU is a substantial LU based on a RAID group, is the physical storage area based on multiple physical storage devices comprising the RAID group, and in a case where the LU is a virtual LU (TP-LU) that conforms to Thin Provisioning, is a physical storage area based on a page allocated from a pool. The pool may comprise multiple substantial LUs, and each LU may be partitioned into two or more pages.

The first tier definition process will be explained by referring to FIG. 1.

The first tier definition process is a process in which a tier is defined based on the type of a LU 900.

Specifically, the first tier definition process is a process in which the storage management server 4 determines the LU 900 that belongs to each tier in the storage apparatus 2 based on the types of multiple LUs 900, and distributes the multiple LUs 900 to multiple tiers based on this determination. According to the example shown in the drawing, a "SSD" type LU belongs to Tier 0, a "SAS" type LU belongs to Tier 1, and a "SATA" type LU belongs to Tier 2. Furthermore, SSD is the abbreviation for Solid State Drive. SAS is the abbreviation for Serial Attached SCSI (Small Computer System. Interface), and is a HDD (Hard Disk Drive). SATA is the abbreviation for Serial ATA (Advanced Technology Attachment) and is a HDD.

In the first tier definition process, the LU 900 distribution-destination tier is decided based on the LU type alone. For this reason, there may be case in which the actual performance of the LU 900 is not taken into account, and the distribution-target tier of the LU 900 is not always appropriate.

Furthermore, there are also cases in which the type of the LU 900 cannot be determined. For example, as shown in FIG. 1, in a case where an external storage apparatus 3 is coupled to the storage apparatus 2, and the storage apparatus 2 is unable to determine the type of a LU 900a, which is a virtualized LU inside this external storage apparatus 3.

In cases like this, the second tier definition process is effective.

Figure 2:
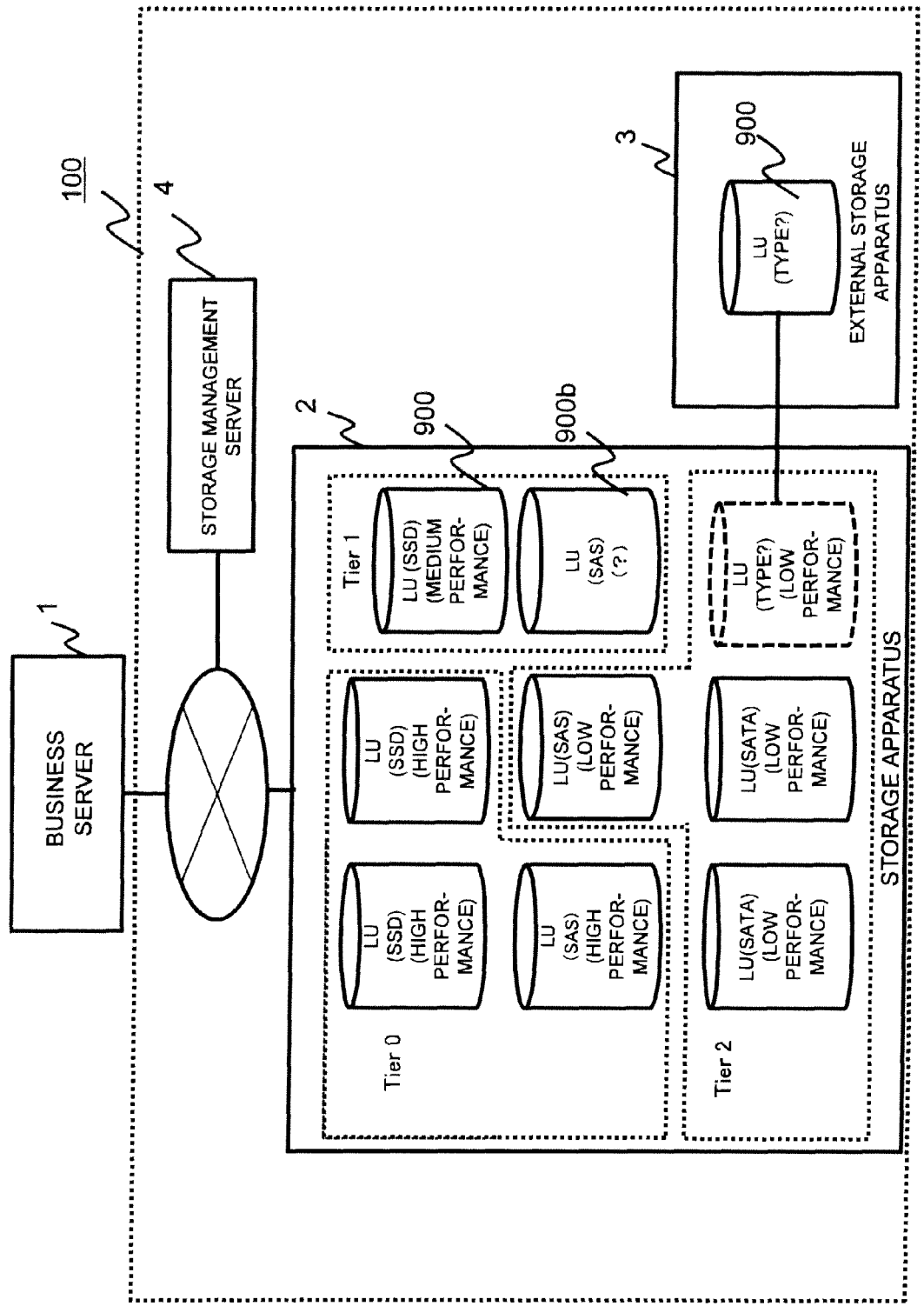
FIG. 2 is a schematic diagram of a second tier definition process related to one embodiment of the present invention.

FIG. 2 is a schematic diagram of the second tier definition process related to one embodiment of the present invention.

The second tier definition process is for defining a tier based on the performance of the LU 900. The performance of the LU 900, for example, is either the I/O frequency of the LU 900 (the number of I/O commands per unit of time (for example, the unit IOPS)) or the response time of the LU 900 (the length of time from receipt of an I/O command until a response is returned). The response time may be an average response time, or may be an arbitrary length of time based on one or more response times (for example, either a maximum response time or a minimum response time).

The performance of each LU 900 is measured. The performance of each LU 900 may be measured by at least one of the business server 1, the storage apparatus 2, or a switching apparatus disposed between the business server 1 and the storage apparatus 2. In the second tier definition process, the storage management server 4 carries out the following processing:

(*) acquires the performance information (information denoting the measured performance of the LU 900) or each LU 900;

(*) classifies multiple LUs 900 into two or more LU groups comprising two or more LUs of similar performance bases on the performance information acquired for each LU 900; and (*) distributes the multiple LUs 900 to multiple tiers such that each LU group belongs to a different tier.

A number of methods for determining the two or more LUs with similar performance are possible, but in this embodiment, cluster analysis is used.

According to the second tier definition process described above, the distribution-target tier of a LU 900 is determined based on the performance information of this LU 900. For this reason, appropriate tier management based on the actual performance of the LU 900 can be carried out.

There may be cases in which a LU 900 exists for which performance information cannot be acquired. In this case, the storage management server 4 carries out the third tier definition process with respect to the LU 900 for which performance information cannot be acquired.

Furthermore, performance information cannot be immediately acquired with respect to an LU 900 that has been newly added to the storage apparatus 2. In this case, the storage management server 4 carries out the additional tier definition process with respect to the added LU 900.

The third tier definition process and the additional tier definition process will be explained hereinbelow.

The storage management server 4 carries out the following processing as preprocessing for the third tier definition process and the additional tier definition process. That is, the storage management server 4 either creates or updates a by-type representative tier table, which is a table that associates the type of each LU 900 with the highest level tier (hereinafter the representative tier) of one or more tiers to which this type LU 900 belongs.

Figure 3:
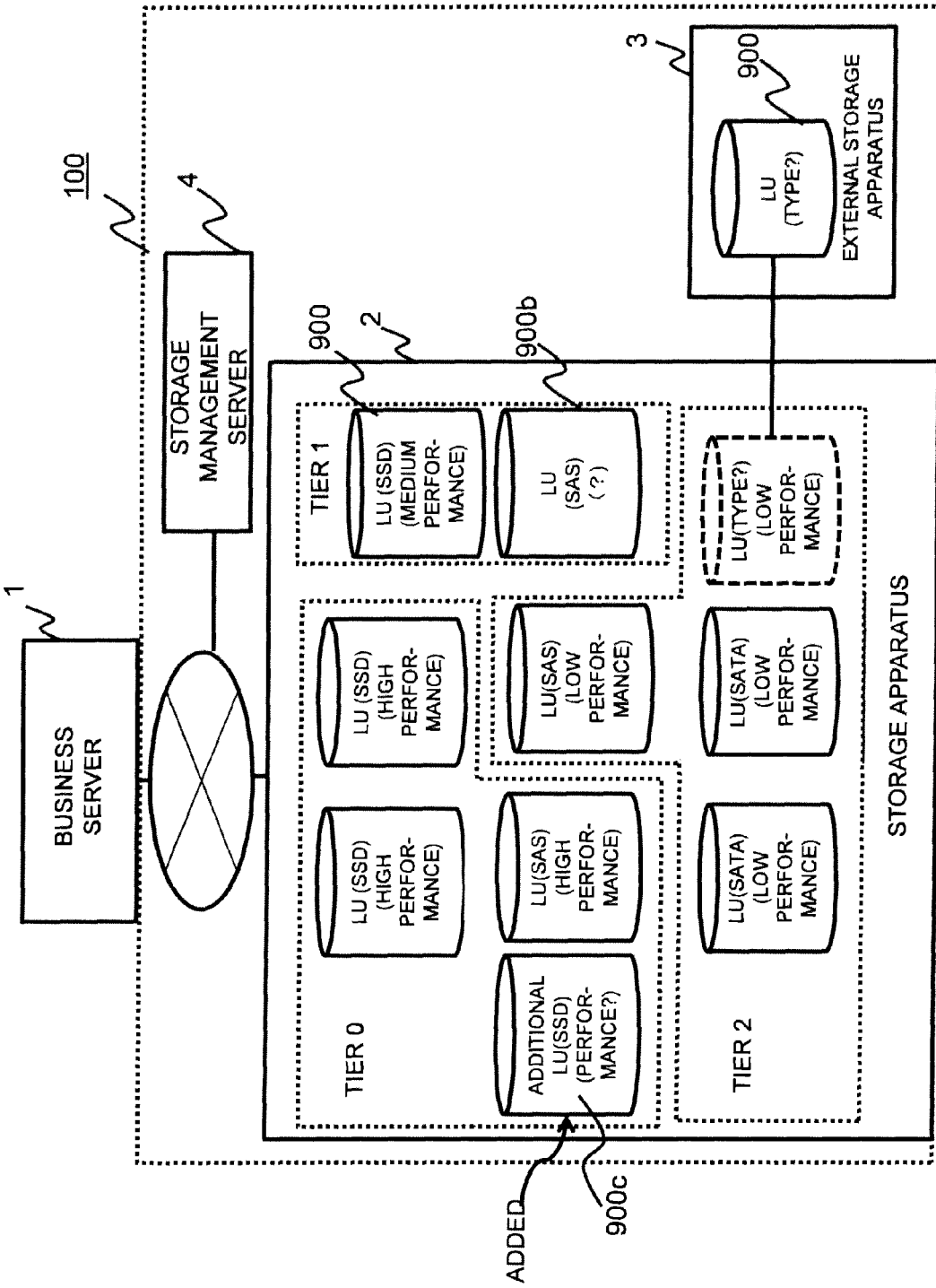
FIG. 3 is a schematic diagram of a third tier definition process and an additional tier definition process related to one embodiment of the present invention.

FIG. 3 is a schematic diagram of the third tier definition process and the additional tier definition process related to one embodiment of the present invention.

The third tier definition process is carried out with respect to a LU 900 for which performance information could not be acquired. In the following explanation of FIG. 3, an LU for which performance information could not be acquired will be called the "target LU".

In the third tier definition process, the storage management server 4 identifies the representative tier corresponding to the type of the target LU 900*b* based on the by-type representative tier table, and distributes the target LU 900*b* to this representative tier.

According to the third tier definition process described above, it is possible to distribute a LU for which performance information could not be acquired to an appropriate tier.

Furthermore, a fourth tier definition process is carried out with respect to a type of LU that the representative tier is unable to acquire. The fourth tier definition process will be explained further below.

Next, the additional tier definition process will be explained by referring to FIG. 3.

The additional tier definition process is carried out in a case where a LU 900 has been added to the storage apparatus 2. Hereinafter in the explanation of FIG. 3, a LU that has been added subsequent to the second tier definition process will be called an "added LU".

In the additional tier definition process, the storage management server 4 identifies the type of a second target LU 900*c*. The storage management server 4 identifies the representative tier corresponding to the type of the added LU 900*c* based on the by-type representative tier table, and distributes the added LU 900*c* to this representative tier.

According to the addition tier definition process described above, it is possible to distribute an added LU to an appropriate tier.

Furthermore, the fourth tier definition process is carried out with respect to a type of LU 900 that the representative tier in unable to acquire.

The fourth tier definition process will be explained hereinbelow.

The fourth tier definition process, as explained above, is carried out with respect to a type of LU that the representative tier is unable to acquire. Hereinafter, in the explanation of the fourth tier definition process here, the type of LU that the representative tier is unable to acquire will be called a "target LU".

In the fourth tier definition process, the storage management server 4 distributes the target LU to the representative tier corresponding to a type for which performance is lower than the target LU type.

According to the fourth tier definition process described above, it is possible to distribute a type of LU that the representative tier is unable to acquire to an appropriate tier.

The storage management server 4 comprises storage configuration information, which is information related to the configuration of the storage apparatus 2. The storage configuration information, for example, may include a LU tier table which associates each LU 900 with each LU 900 tier. The storage management server 4 receives from the administrator identification information of a migration-source LU 900 and identification information of the tier that is the migration destination of this LU 900. In accordance with this, the storage management server 4 identifies any of the LUs that correspond to the migration-destination tier from the LU tier table, and sends to the storage apparatus 2 a migration instruction comprising (x) and (y) below:

(x) the identification information of the migration-source LU (the migration-source LU identification information received from the administrator); and (y) the identification information of the migration-destination LU (the identification information of the above-mentioned identified LU). In accordance with this, data is migrated from the migration-source LU to the migration-destination LU by the storage apparatus 2.

This embodiment will be explained in detail hereinbelow.

Figure 4:
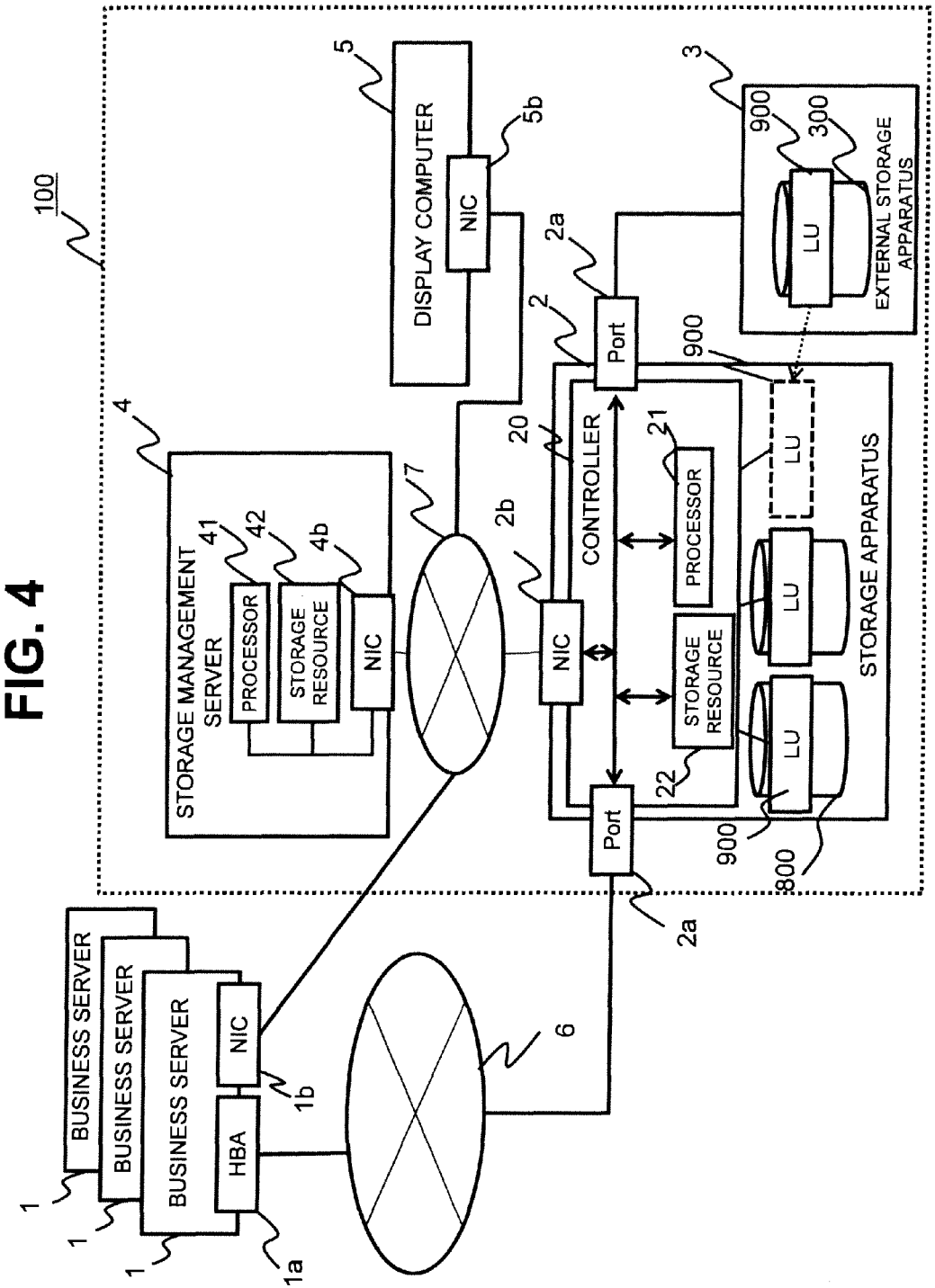
FIG. 4 shows the configuration of a computer system related to one embodiment of the present invention.

FIG. 4 shows the configuration of a computer system related to this embodiment.

A storage system 100 is coupled to multiple (or one) business servers 1. The storage system 100 comprises a storage management server 4, one or more storage apparatuses 2, and a display computer 5. The respective HBA 1*a* (Host Bus Adapters) of multiple business servers 1 and a port 2*a* of the storage apparatus 2 are respectively coupled to a communication network 6 (for example, a SAN (Storage Area Network)). Furthermore, a storage management server 4 NIC 4*b* (Network Interface Card), a storage apparatus 2 NIC 2*b*, a display computer 5 NIC 5*b*, and a business server 1 NIC 1*b* are coupled to a communication network 7 (for example, a LAN (Local Area Network)). According to the above explanation, an example is given in which the communication network 6 is a SAN and the communication network 7 is a LAN, but the communication networks 6 and/or 7 are not limited thereto. Furthermore, for example, the communication networks 6 and 7 may be different communication networks, or may be the same communication network.

The business server 1 is a computer for carrying out various processing, such as the issuing of an I/O command (either a write command or a read command) that specifies the LU 900 of the storage apparatus 2. The business server 1, in addition to the communication interface apparatuses (the HBA 1*a* and the NIC 1*b*), comprises a storage resource (for example, a memory) and a processor (for example, a CPU) that is coupled to these components. This processor carries out processing such as issuing an I/O command by executing a computer program that is stored in the storage resource inside the business server 1. The business server 1, for example, is a personal computer, a workstation, or a mainframe.

The storage apparatus 2 comprises multiple RAID groups 800, and a controller 20 that is coupled to these RAID groups 800. The storage apparatus 2 writes data to a RAID group 800 and writes data from a RAID group 800 in accordance with an I/O command from the business server 1. The port 2*a* of the storage apparatus 2 may be coupled to the external storage apparatus 3. In this case, the storage apparatus 2 and the external storage apparatus 3 may both be the same hardware configuration or may be different hardware configurations. The storage apparatus 2 may comprise a LU that is formed on the basis of a LU based on a RAID group 300 of the external storage apparatus 3.

The LU may be created based on a single physical storage device instead of a RAID group 800, 300. It is preferable that the multiple physical storage devices that comprise a RAID group be the same type. The physical storage device, for example, may be a SSD, SAS, or SATA.

The controller 20 is an apparatus for controlling the operation of the storage apparatus 2. The controller 20 comprises a communication interface apparatuses (for example, ports 2*a*, 2*c* and a NIC 2*b*), a storage resource (for example, a memory) 22, and a processor (for example, a CPU) 21 that is coupled to these components. The communication interface apparatus, the processor 21, and the storage resource 22 may each be a single unit or may be multiple units. The storage resource 22, for example, can comprises a storage area (a cache area) that is able to temporarily store data exchanged between the storage apparatus 2 and the business server 1, and a storage area (a control area) that is able to store data and a computer program for controlling the storage apparatus 2. The processor 21 can read and execute the computer program from the control area.

The display computer 5 is a client computer of the storage management server 4. The display computer 5 comprises a display apparatus and an input apparatus. The display apparatus and the input apparatus may be an apparatus, for example, a touch panel-type display apparatus, that integrates these apparatuses. Information sent from the storage management server 4 to the display computer 5 is displayed on the display apparatus of the display computer 5. The administrator operates the display computer 5 based on the information that has been displayed on the display computer 5. The display computer 5 sends an instruction to the storage management server 4 in response to an operation by the administrator. The display computer 5, for example, may be a general-purpose personal computer.

The storage management server 4 manages the LU types and LU tiers in the storage apparatus 2. The storage management server 4 comprises a communication interface apparatus (for example, a NIC 4b), a storage resource (for example, a memory) 42 for storing information and a computer program, and a processor (for example, a CPU) 41 that is coupled to these components. The processor 41 executes a computer program that is in the storage resource 42.

Figure 5:
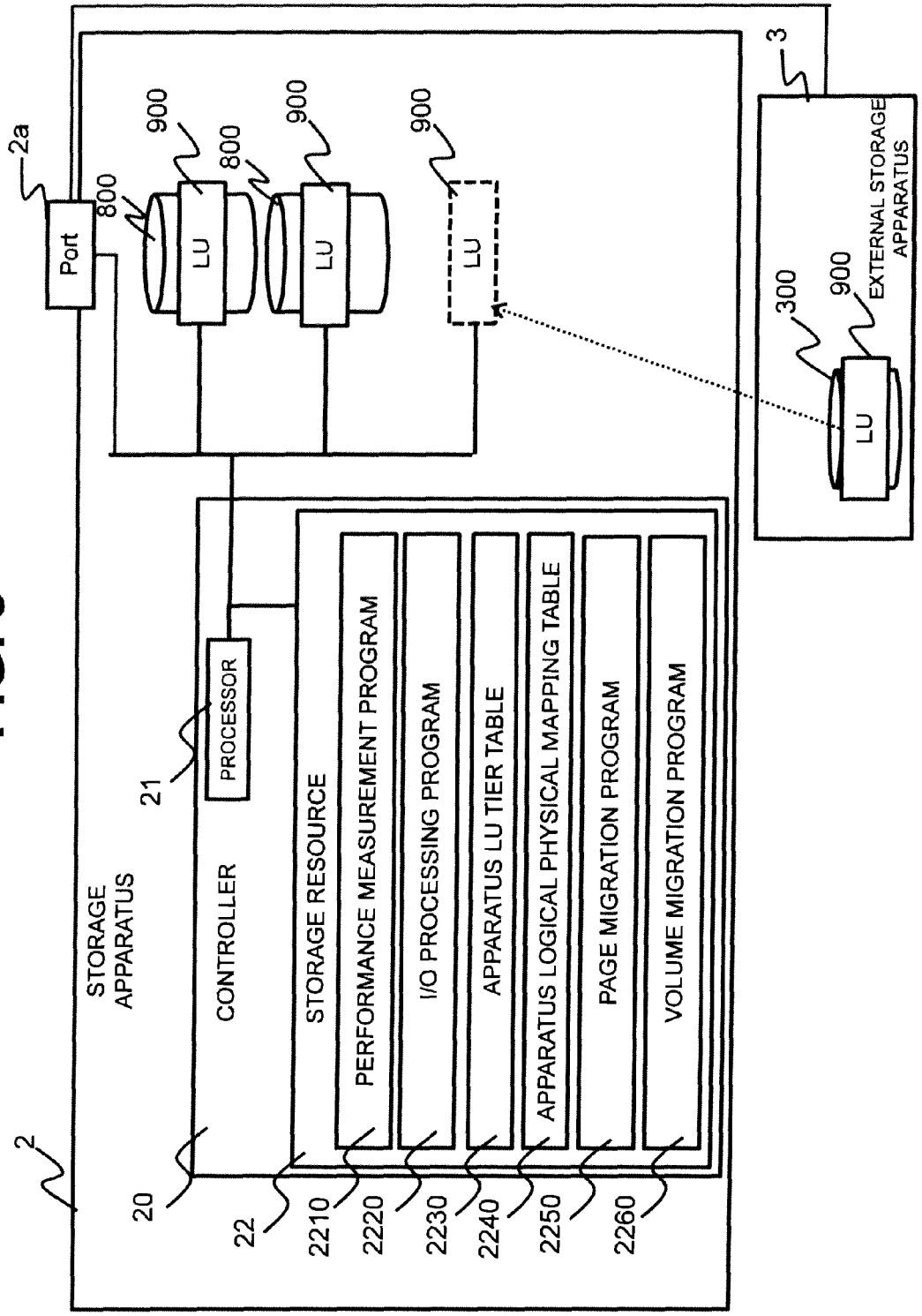
FIG. 5 shows the configuration of a storage apparatus 2.

FIG. 5 shows the configuration of the storage apparatus 2.

As described above, multiple RAID groups 800 and the external storage apparatus 3 are coupled to the controller 20. One or more LUs (substantial LUs) 900 are formed based on one RAID group 800. The storage apparatus 2 can comprise a virtual LU, for example, either a TP-LU or a LU that conforms to a storage virtualization technology (a LU based on a LU inside the external storage apparatus 3). Furthermore, the storage apparatus 2 can comprise a pool comprising multiple substantial LUs. In the pool, the respective LUs comprising the pool are partitioned into two or more pages.

There may be case in which two or more of the multiple LUs have the same performance, and cases in which two or more of the LUs have different performance. LU performance, as described above, is a function of the performance and/or the type of the physical storage device related to the storage area that is being allocated to this LU. For example, arranged in order from the device having the highest I/O performance, an SSD, a SATA, and a SAS will be ranked as SSD, SAS, SATA. However, the ranking in accordance with the I/O performance of the physical storage device is not decided primarily of the basis of the type of the physical storage device, but rather, for example, may be decided in accordance with the difference between the physical storage device manufacturers and models.

Furthermore, the performance of the LU 900 is a function of the type (for example, the number of physical storage devices comprising the RAID group, the RAID level of the RAID group, and the type(s) and/or model(s) of the physical storage device(s) comprising the RAID group) of the RAID group related to the physical storage area based on this LU 900. Furthermore, the performance of the LU 900 will differ in accordance with whether the physical storage area based on this LU 900 is in the storage apparatus 2 or in the external storage apparatus 3. This is because in a case where the physical storage area based on the LU 900 is in the external storage apparatus 3 (a case in which the LU 900 is a LU that has been virtualized from an external storage apparatus 3 LU), communications between the storage apparatus 2 and the external storage apparatus 3 will be necessary. The performance of the external storage apparatus 3 and the apparatus(es) coupling the storage apparatus 2 and the external storage apparatus 3 will influence the communication speed between the storage apparatus 2 and the external storage apparatus 3.

The storage resource 22, for example, stores as computer programs to be executed by the processor 21a performance measurement program 2210, an I/O processing program 2220, a page migration program 2250, and a volume migration program 2260. Furthermore, the storage resource 22, for example, stores an apparatus LU tier table 2230 and an apparatus logical physical mapping table 2240 as information.

The performance measurement program 2210 is for measuring the performance of the LU 900. LU 900 performance, for example, is the value of IOPS, a response time, reliability, an error rate, usage and the like. In the following explanation, IOPS and response time are LU performance. With respect to the LU, "IOPS" is the number of I/O commands specifying this LU that are received (or issued) per second. The "response time" is the length of time after the storage apparatus 2 receives an I/O command specifying this LU until the storage apparatus 2 returns a response (or, the length of time after the business server 1 issues an I/O command specifying this LU until this business server 1 receives a response). The performance measurement program 2210 measures the performance of the LU 900 and stores the performance information (measurement result) denoting this measured performance in the storage resource memory 22. The measurement result may be sent to the storage management server 4 from the storage apparatus 2 in response to a storage management server 4 request (or, without a request from the storage management server 4). Furthermore, the business server 1 may carry out the performance measurement of the LU 900. In accordance with this, the computer program (for example, an agent), which is executed by the business server 1, may measure the performance of the LU 900 and temporarily store the measurement result in the business server 1 storage resource. The measurement result may be sent to the storage management server 4 from the business server 1 in response to a storage management server 4 request (or without a storage management server 4 request). The business server 1 may send a test I/O command to the storage apparatus 2 as an I/O command specifying a LU in order to measure LU performance.

The I/O processing program 2220 is for processing an I/O command received from the business server 1. The I/O processing program 2220, in a case where a write command specifying a certain LU 900 has been received, writes the write-target data to the cache area, refers to the apparatus logical physical mapping table 2240, identifies the physical storage area corresponding to this LU 900, and writes the write-target data inside the cache area to the identified physical storage area. The I/O processing program 2220 may return a response with respect to the write command at the point in time at which this program 2220 writes the write-target data to the cache area, writes the target-write data to the physical storage area, or transfers the write-target data to the external storage apparatus 3 and receives a response from the external storage apparatus 3. Furthermore, the I/O processing program 2220, in a case where a read command specifying a certain LU 900 has been received, refers to the apparatus logical physical mapping table 2240, identifies the physical storage area corresponding to this LU 900, reads the read-target data from the identified physical storage area, writes this data to the cache area, and returns this data inside the cache area to the business server 1.

The apparatus LU tier table 2230 comprises information denoting the relationship between an LU 900 and the tier to which this LU 900 belongs for each LU 900 in the storage apparatus 2. The apparatus LU tier table 2230 is configured substantially the same as the LU tier table 4330, which is stored in the storage management server 4. The LU tier table 4330 will be described further below.

The apparatus logical physical mapping table 2250 comprises information denoting the corresponding relationship between a LU 900 and the physical storage area corresponding to this LU 900 for each LU 900 in the storage apparatus 2.

The page migration program 2250 is for carrying out a page migration, that is, for migrating data between pages. The pool in which the migration-source page exits and the pool in which the migration-destination page exists may be the same pool or different pools. In accordance with a page migration, the tier to which the migration-source page belongs differs from the tier to which the migration-destination page belongs.

The volume migration program 2260 is for carrying out a volume migration, (that is, for migrating data between LUs). The tier to which the migration-source LU belongs differs from the tier to which the migration-destination LU belongs. Furthermore, in a volume migration, a first LUN (Logical Unit Number), which has been allocated to the migration-source LU, is allocated to the migration-destination LU instead of the migration-source LU. After the volume migration, the business server 1 is able to carry out an I/O with respect to the migration-destination LU by sending an I/O command comprising the first LUN.

In this way, in this embodiment, either a page migration or a volume migration is carried out between tiers. For this reason, it is important that the LU 900 be distributed to the appropriate tier. The LU 900 may be a real LU or a virtual LU. A real LU may be a LU with respect to which the business server 1 is able to carry out I/O operations, or a LU, which comprises a pool with respect to which the business server 1 is not able to carry out I/O operations (for example, a pool for a TP-LU, or a pool for a snapshot LU). A virtual LU may be the above-mentioned TP-LU or a snapshot LU, which is a snapshot of a certain LU, or a LU, which has been obtained by virtualizing a LU inside the external storage apparatus 3 in accordance with a storage virtualization technology.

Figure 6:
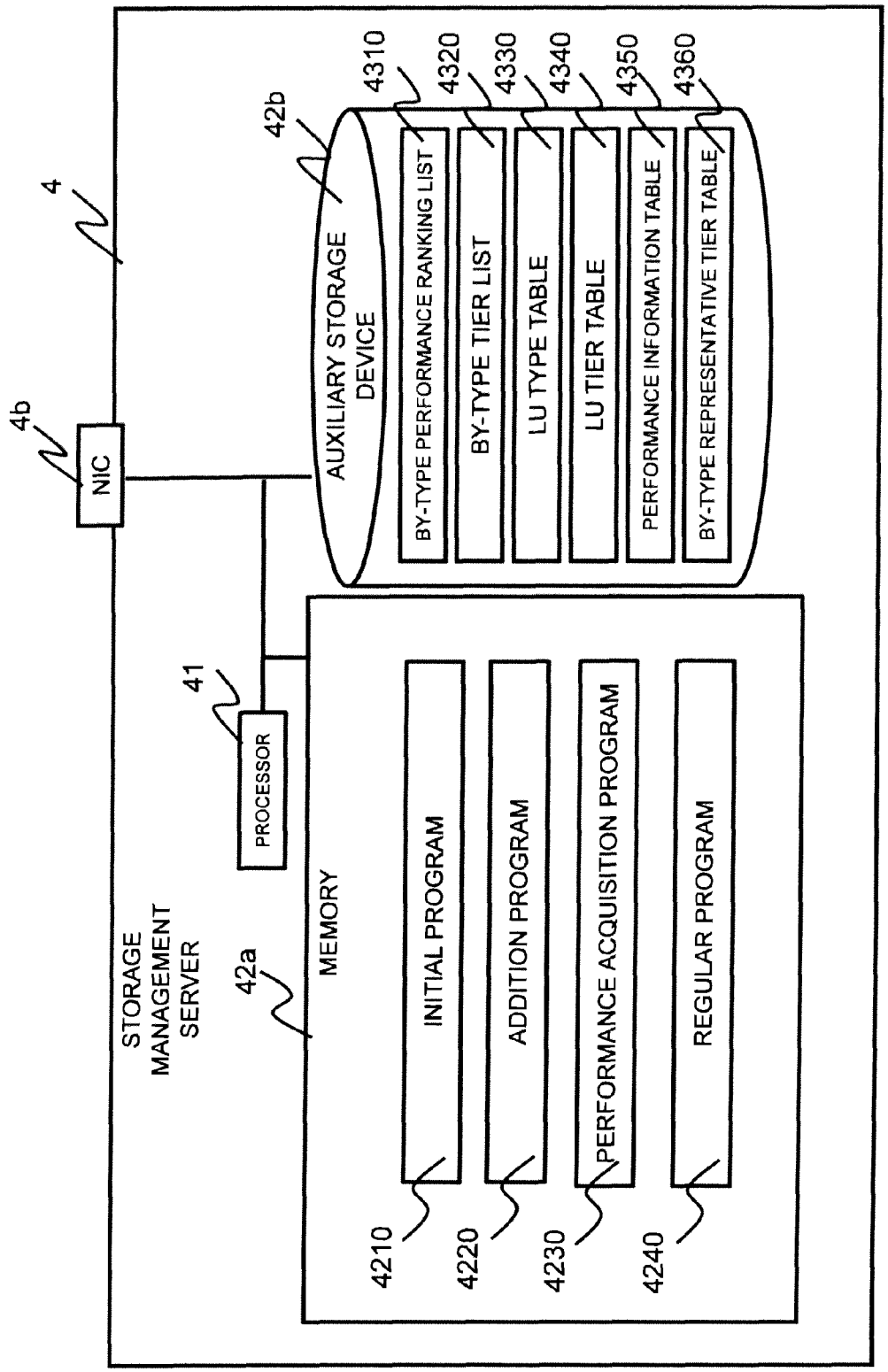
FIG. 6 shows the configuration of a storage management server 4.

FIG. 6 shows the configuration of the storage management server 4.

The storage management server 4, as was described hereinabove, comprises a communication interface apparatus (for example, a NIC 4b), a storage resource 42, and a processor 41 that is coupled to these components. The storage resource 42, for example, comprises a memory 42a and an auxiliary storage device 42b.

The memory 42a is used as a cache for temporarily storing prescribed data. Furthermore, the memory 42a, for example, stores an initial program 4210, an addition program 4220, a performance acquisition program 4230, and an addition program 4240 as computer programs to be executed by the processor 41.

The auxiliary storage device 43 stores various types of lists and tables. Specifically, for example, the auxiliary storage device 43 has a by-type performance ranking list 4310, a by-type tier list 4320, a LU type table 4330, a LU tier table 4340, a performance information table 4350, and a by-type representative table 4360. At least one of these lists and tables may be created after the storage apparatus 2 is in operation. The lists and tables in the auxiliary storage device 43 will be explained below.

FIG. 7 shows the configuration of the by-type performance ranking list 4310.

The by-type performance ranking list 4310 is for showing the LU types in order from the highest I/O performance. Specifically, the list 4310, for example, comprises the following information for each LU type:
(*) a ranking 4311, which is information denoting the I/O performance ranking of the LU; and
(*) a type 4312, which is information denoting the type of the LU.

According to the example in this drawing, SSD, SAS, and SATA is the ranking in descending order from the highest I/O performance. Furthermore, the ranking of an unknown type "Unknown" is the lowest. In a case where a new type LU is added to the storage apparatus 2, the list 4310 is updated. The updating of the list 4310 may be carried out by the administrator or may be performed automatically.

FIG. 8 shows the configuration of the by-type tier list 4320.

The by-type tier list 4320 shows the corresponding relationship between a LU type and a tier. Specifically, for example, this list 4320 comprises the following information for each LU type:
(*) a type 4321, which is information denoting a LU type; and
(*) a tier 4322, which is information (for example, a number) denoting the tier to which the LU belongs.

According to the example in this drawing, the type having the highest I/O performance belongs to the tier having the smallest number. For example, the "SSD" type LU belongs to the tier "Tier 0" and the "SAS" type LU belongs to the tier "Tier 1". Furthermore, the tier to which the LU whose type is not known ("Unknown" type LU) belongs is the lowest level tier "Tier 3". Furthermore, in the example of this drawing, one tier is associated with one type, but the configuration may also be such that multiple tiers are associated with one type.

FIG. 9 shows the configuration of the LU type table 4330.

The LU type table 4330 shows the corresponding relationship between a LU and the type of this LU. Specifically, for example, this table 4330 comprises the following information for each LU 4331:
(*) a LU 4331, which is information denoting a LU identifier (for example, a LUN); and
(*) a type 4332, which is information denoting the type of the LU.

According to the example in this drawing, the type of LU "LU 1" is "SSD", the type of LU "LU 2" is "SSD", the type of LU "LU 5" is "SAS", and the type of LU "LU 6" is "Unknown".

FIG. 10 shows the configuration of the LU tier table 4340.

The LU tier table 4340 shows the corresponding relationship between a LU and the tier to which this LU belongs. Specifically, for example, this table 4340 comprises the following information for each LU:
(*) a LU 4341, which is information denoting a LU identifier; and
(*) a tier 4342, which is information denoting the tier to which this LU belongs.

According to the example in this drawing, it is clear that the LU "LU 1" belongs to the tier "Tier 0", and the LU "LU 3" belongs to the tier "Tier 1". Furthermore, this table 4340 is created in accordance with the initial program 4210 being executed, and is updated as needed in accordance with the regular program 4240 being executed.

FIG. 11 shows the configuration of the performance information table 4350.

The performance information table 4350 shows the performance of each LU. Specifically, for example, this table 4350 comprises the following information for each LU:
(*) a LU 4351, which is information denoting a LU identifier;
(*) a IOPS 4352, which is information denoting the frequency of I/Os (IOPS) with respect to the LU; and
(*) a response time 4353, which is information denoting the LU response time.

According to the example of this drawing, the IOPS of the LU "LU 1" is "250 k", and the response time of the LU "LU 1" is "0.20 μSec". Furthermore, the IOPS and the response time, for example, are measured regularly (or irregularly) by the performance measurement program 2210 of the storage apparatus 2. Then, the performance acquisition program 4230 of the storage management server 4 acquires this performance result from the storage apparatus 2, and registers information conforming to the acquired result in the table 4350.

Figure 12:
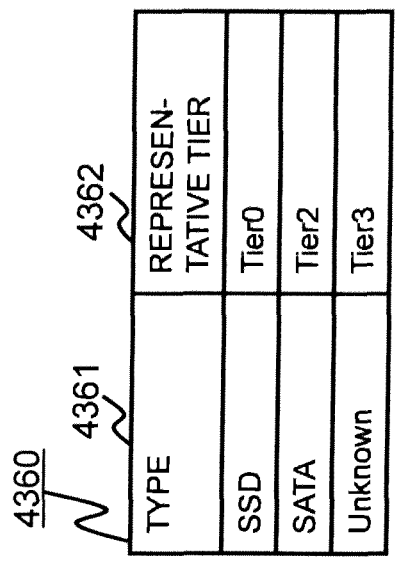
FIG. 12 shows the configuration of a by-type representative tier table 4360.

FIG. 12 shows the configuration of the by-type representative tier table 4360.

The by-type representative tier table 4360 shows the corresponding relationship between the LU type and the representative tier. Specifically, for example, this table 4360 comprises the following information for each LU type:

(*) a type 4361, which is information denoting a LU type; and
(*) a tier 4362, which is information denoting the representative tier to which the LU belongs.

According to the example of this drawing, the representative tier of the "SSD" type LU is "Tier 0", and the representative tier of the "SATA" type LU is "Tier 2". For example, in a case where the "SSD" type LU belongs to two tiers, i.e., "Tier 0" and "Tier 1", the representative tier is the "Tier 0". Also, the representative tier of the LU for which the type is not known ("Unknown" type LU) is "Tier 3". Furthermore, in the example shown in the drawing, the higher the level of the tier the smaller the tier number, so that the highest level tier is the "Tier 0".

The processes carried out in this embodiment will be explained hereinbelow.

Figure 13:
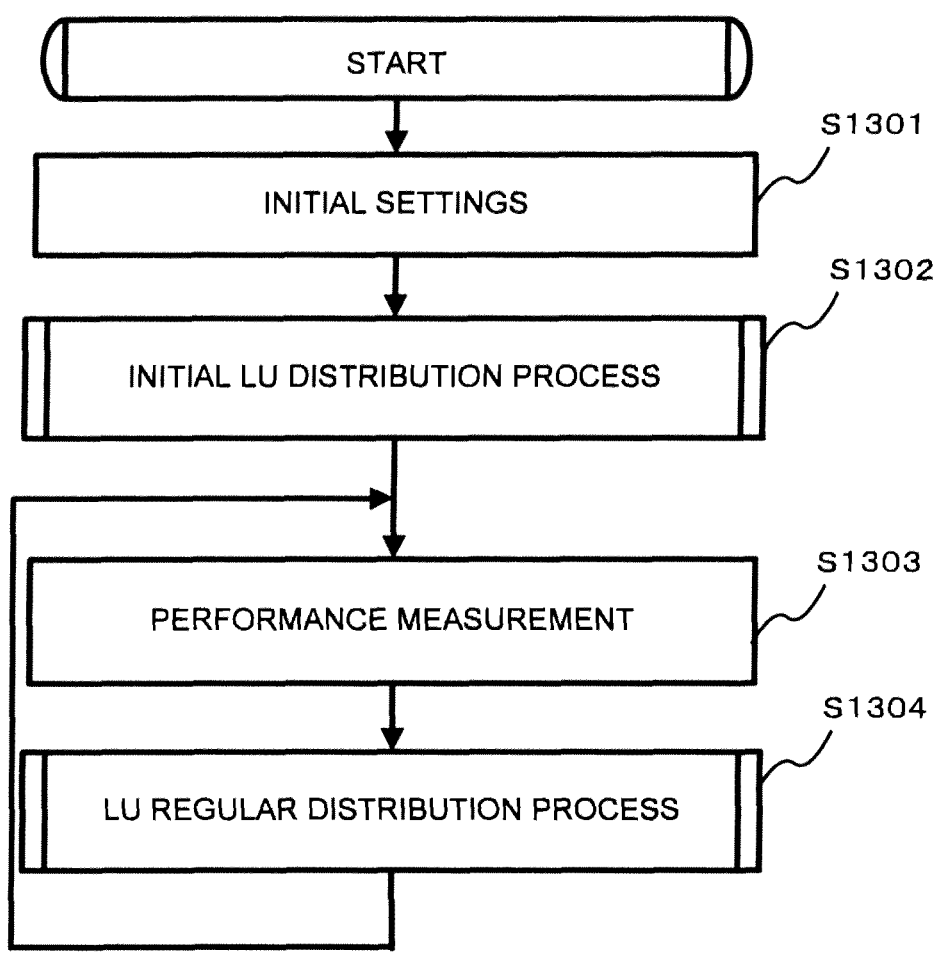
FIG. 13 is a flowchart of all the processing carried out in one embodiment of the present invention.

FIG. 13 is a flowchart of all the processes carried out in one embodiment of the present invention.

In S1301, the administrator carries out the initial settings. Specifically, for example, the administrator configures administrator-desired numerical values for each type of item in an initial settings screen 510 (refer to FIG. 14) displayed on the display computer 5. The types of numerical values, for example, include "allowable tier range", "maximum number of tiers", "monitoring time", and "measurement start time".

Figure 22:
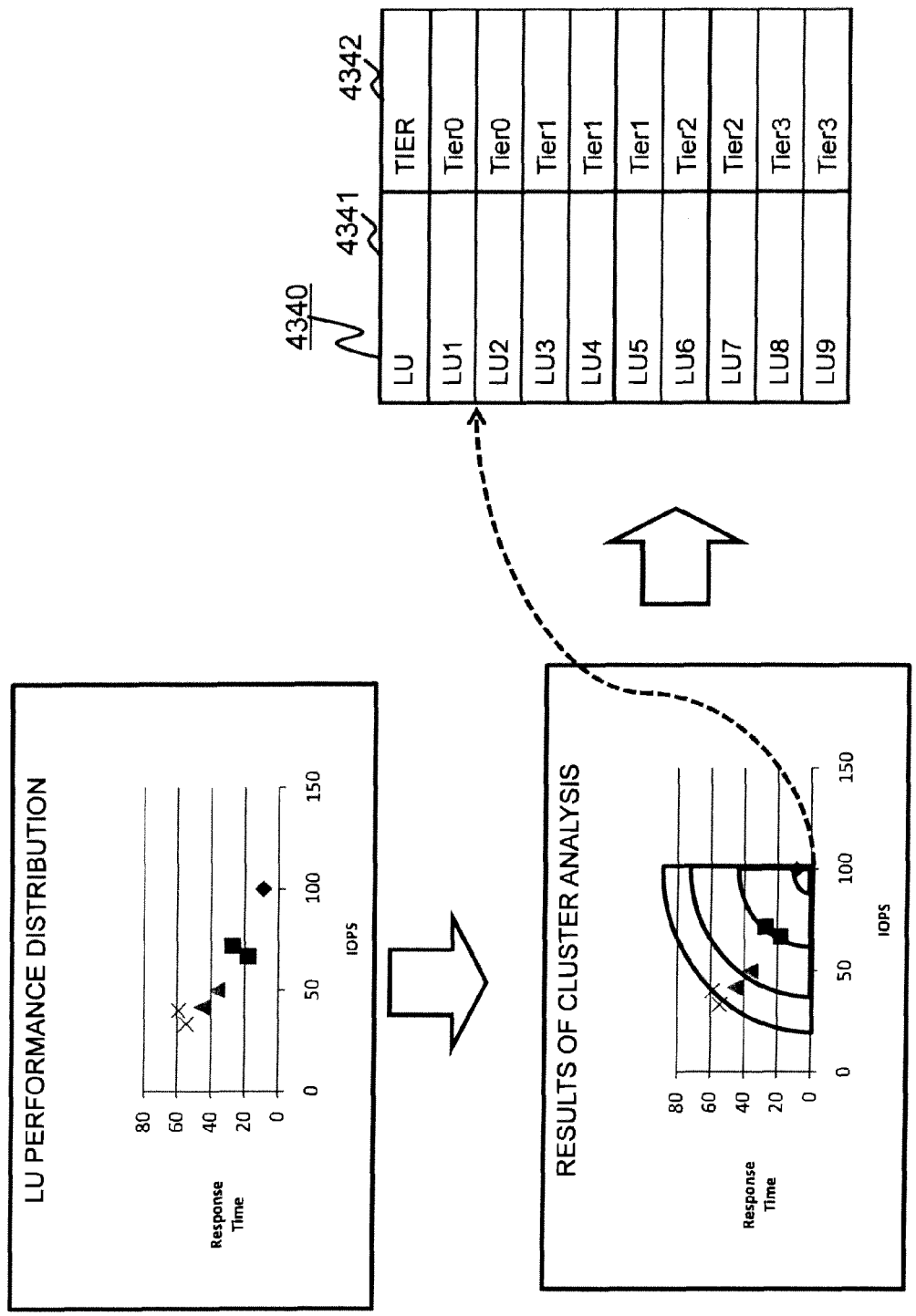
FIG. 22 is a schematic diagram of the redefining of a tier based on LU performance.

The "allowable tier range" denotes the allowable range of LU 900 performance differences in a single tier (specifically, the range of performance values of the LU performance information) For example, it is supposed that normalization is performed such that the maximum value of the response time and IOPS, respectively, is 100, and the performance value of each LU 900 is plotted on a graph that represents the response time along the vertical axis and the IOPS along the horizontal axis (for example, refer to FIG. 22). In this graph, the distance between two LU performance values is the LU performance difference. The maximum value of the LU performance difference in a single tier is the allowable tier range. The allowable tier range corresponds to the definition of LU performances as being similar.

The "maximum number of tiers" is the maximum value of the number of tiers to be defined in the storage apparatus 2.

The "monitoring time" is the time period during which the LU 900 performance is acquired from the storage apparatus 2. According to the example shown in the diagram, the acquisition of LU 900 performance is carried out in 12-hour cycles.

The "measurement start time" is from when the first tier definition process has ended until the first LU 900 performance measurement is carried out. According to the example shown in the drawing, the acquisition of LU 900 performance is first carried out after a lapse of 36 hours following the end of the LU initial distribution process (the first tier definition process).

In S1302, the LU initial distribution process is carried out. The LU initial distribution process is the first tier definition process. In accordance with this process, multiple LUs inside the storage apparatus 2 are distributed to multiple tiers.

In S1303, the controller 20 of the storage apparatus 2 monitors the performance of each LU, and stores information denoting each LU's performance in the storage resource 22.

S1304 is carried out regularly. Specifically, the LU regular distribution process is carried out. In the LU regular distribution process, any of the second through the fourth tier definition processes is carried out.

In accordance with this, in a case where the distribution-destination tier of an LU is inappropriate for this LU from the standpoint of LU performance, this LU distribution destination is changed to a tier that is appropriate from the standpoint of this LU's performance.

Figure 15:
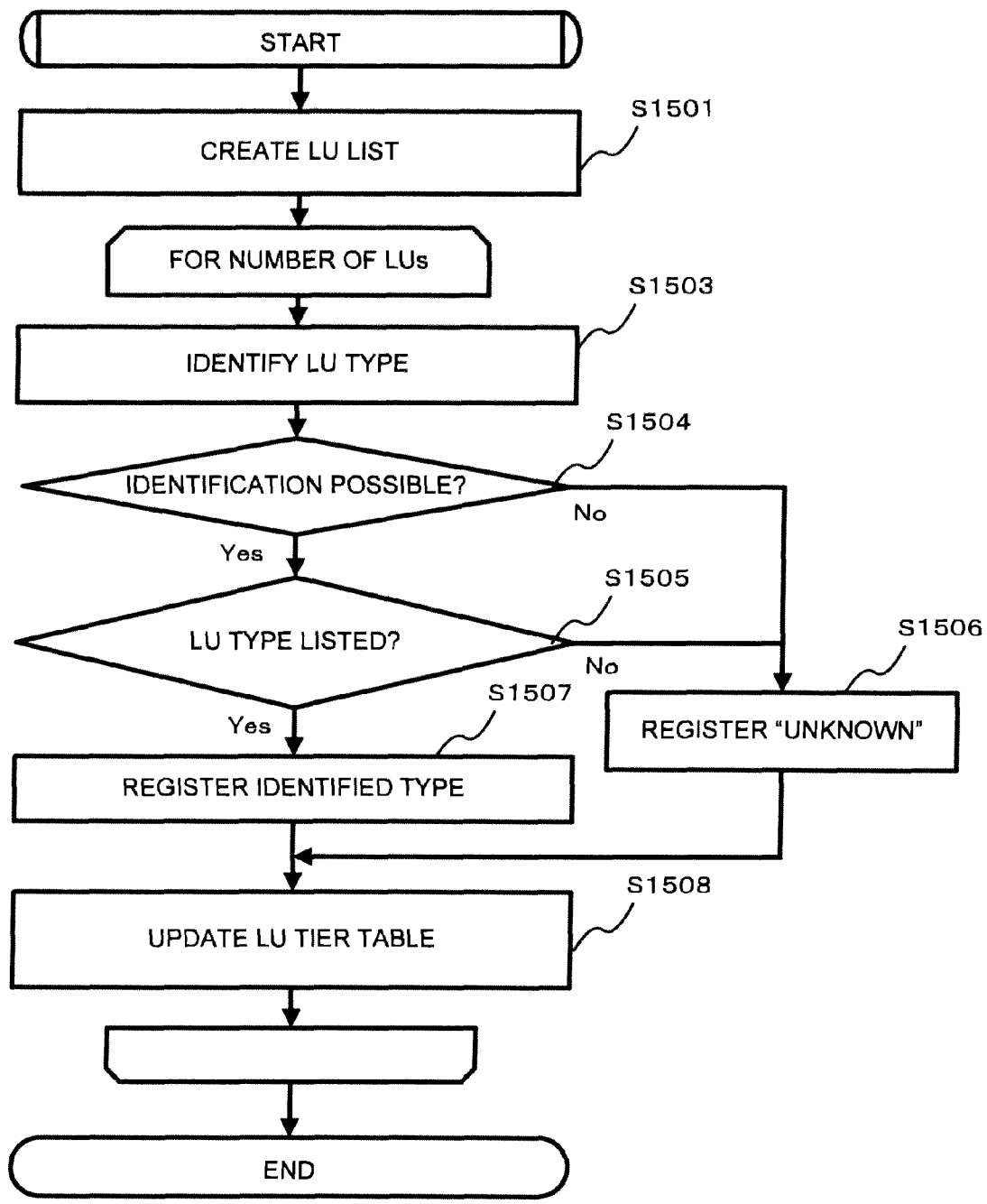
FIG. 15 is a flowchart of the processing for an initial distribution of LUs.
Figure 16:
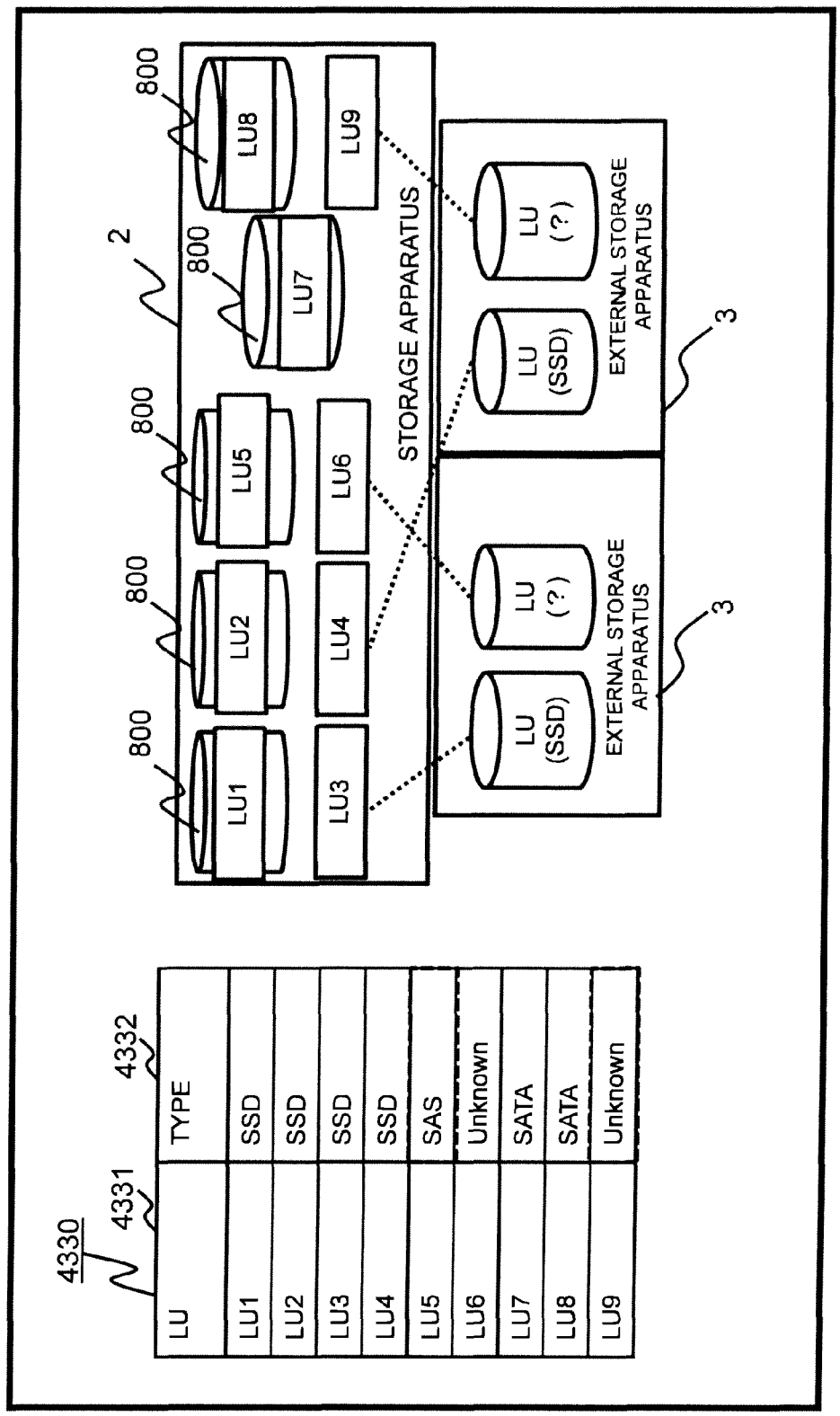
FIG. 16 is a schematic diagram of a process for creating the LU type table 4330.
Figure 17:
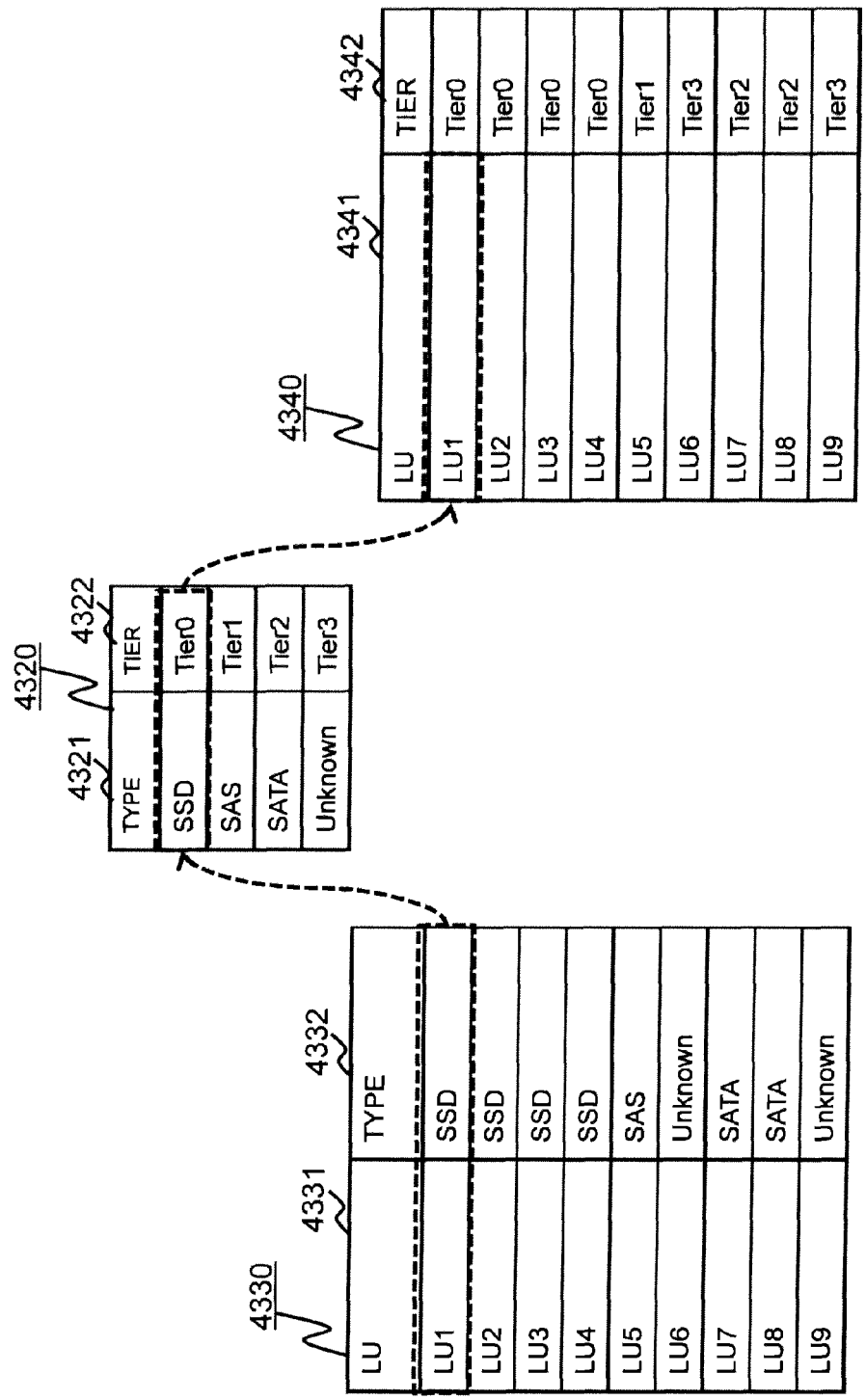
FIG. 17 is a schematic diagram of a process for creating the LU tier table 4340.

FIG. 15 is a flowchart of the LU initial distribution process. FIG. 16 is a schematic diagram of the process for creating the LU type table 4330. FIG. 17 is a schematic diagram of the process for creating the LU tier table 4340.

In S1501, the initial program 4210 acquires the ID (for example, the LUN) of the LU 900 of the storage apparatus 2 from the storage apparatus 2.

Next, the initial program 4210 carries out the processing from S1503 through S1508 for each LU. The processing from S1503 through S1508 will be explained below by taking a single LU as an example (will be called the "target LU" in the explanation of FIG. 15).

In S1503, the initial program 4210 acquires the type of the target LU 900. Specifically, for example, the initial program 4210 queries the storage apparatus 2 for the type of the target LU 900.

In S1504, the initial program 4210 determines whether or not it is possible to acquire the type of the target LU 900 with respect to the query of S1503. In a case where the S1504 determination result is affirmative, S1505 is carried out, and in a case where this determination result is negative, S1506 is carried out.

In S1505, the initial program 4210 refers to the by-type tier list 4320 (refer to FIG. 8), and determines whether or not the acquired LU 900 type exists in the by-type tier list 4320. In a case where the result of this determination is affirmative, S1507 is carried out. For example, in FIG. 16, in a case where the target LU is "LU 5", the initial program 4210 detects the fact that LU 5 type "SAS" exists in the by-type tier list 4320, and carries out S1507 with respect to LU 5. Furthermore, in a case where the result of the determination is negative, the initial program 4210 carries out S1506. For example, in FIG. 16, in a case where the target LU is "LU 9", the initial program 4210 detects the fact that the type acquired from LU 9 does not exist in the by-type tier list 4320, and carries out S1506 with respect to LU 9.

In S1506, the initial program 4210 registers "Unknown" in the by-type tier list 4320 as the type 4322 corresponding to the target LU (refer to FIG. 16). Next, the initial program 4210 carries out S1508.

In S1507, the initial program 4210 stores information denoting the type acquired in S1505 in the by-type tier list 4320 as the type 4322 corresponding to the target LU. For example, is a case where the target LU is "LU 5" (Refer to FIG. 16), the initial program 4210 registers "SAS" as the type 4322 corresponding to the LU 5.

In S1508, the initial program 4210 registers information denoting the ID of the target LU and the tier to which the target LU belongs in the LU tier table 4340. Specifically, for example, the initial program 4210 carries out the following processing as shown in FIG. 17:

(*) identifies the type corresponding to the target LU 900 from the LU type table 4330;
(*) identifies the tier corresponding to this identified type from the by-type tier list 4320; and (*) registers the ID of the target LU 900 as the LU 4341, and, in addition, registers information denoting the identified tier as tier 4342 in the LU tier table 4340.

In a case where the target LU is LU 1, as shown in FIG. 17, the initial program 4210 identifies LU 1 type "SSD" from the LU type table 4330, and identifies the tier "Tier 0" corresponding to the type "SSD" from the by-type tier list 4320. Then, the initial program 4210 registers the LU 1 ID "LU 1" and the identified tier "Tier 0" in the LU tier table 4340.

As described above, in accordance with the LU initial distribution process, the LUs 900 are distributed to tiers based on the types of the LUs 900. In accordance with this, it becomes possible to hierarchize the LUs 900 based on the LU 900 types (in other words, general LU performance in accordance with LU 900 type) prior to measuring the actual performance of the LUs 900.

Figure 18:
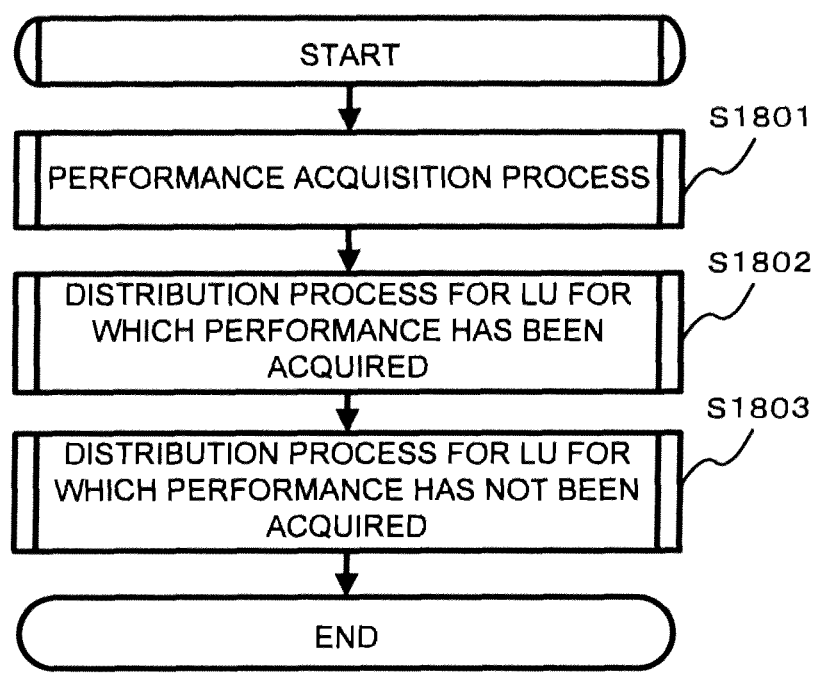
FIG. 18 is a flowchart of the processing for a regular distribution of LUs.

FIG. 18 is a flowchart of the LU regular distribution process.

Figure 14:
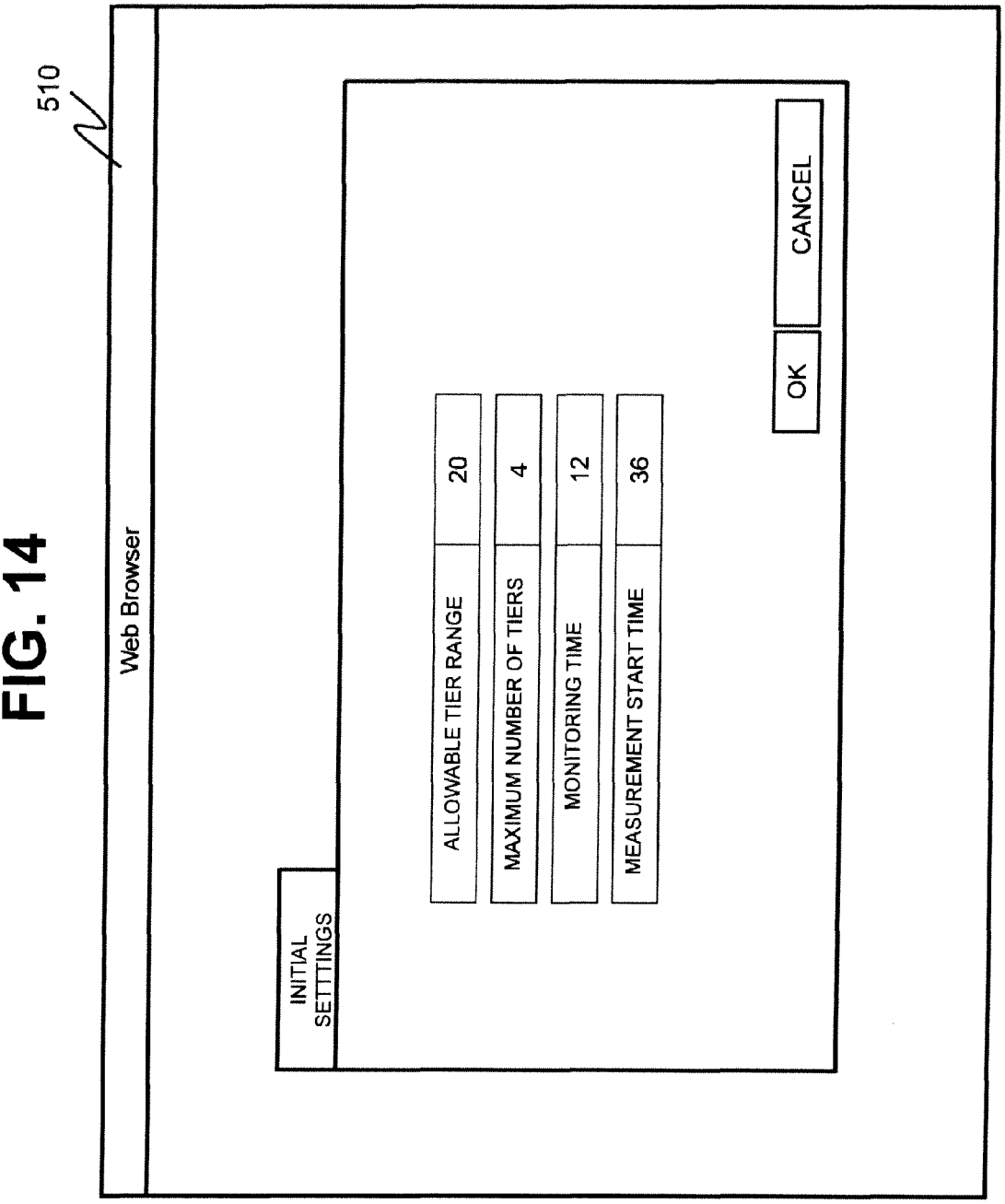
FIG. 14 shows an initial settings screen.

In S1801, the performance acquisition program carries out a LU performance acquisition process. This process, according to the example of FIG. 14, is started at either the point in time 36 hours after the end of the LU initial distribution process, or 12 hours after the end of the immediately previous S1801 (LU performance acquisition process). The LU performance acquisition process will be explained further below.

In S1802, the addition program 4240 carries out a distribution process for a LU for which performance was acquired. S1802 is processing that is carried out with respect to a LU for which performance acquisition was possible in S1801.

In S1803, the addition program 4240 carries out a distribution process for a LU for which performance was not acquired. S1803 is processing that is carried out with respect to a LU for which performance acquisition was not possible in S1801.

Figure 19:
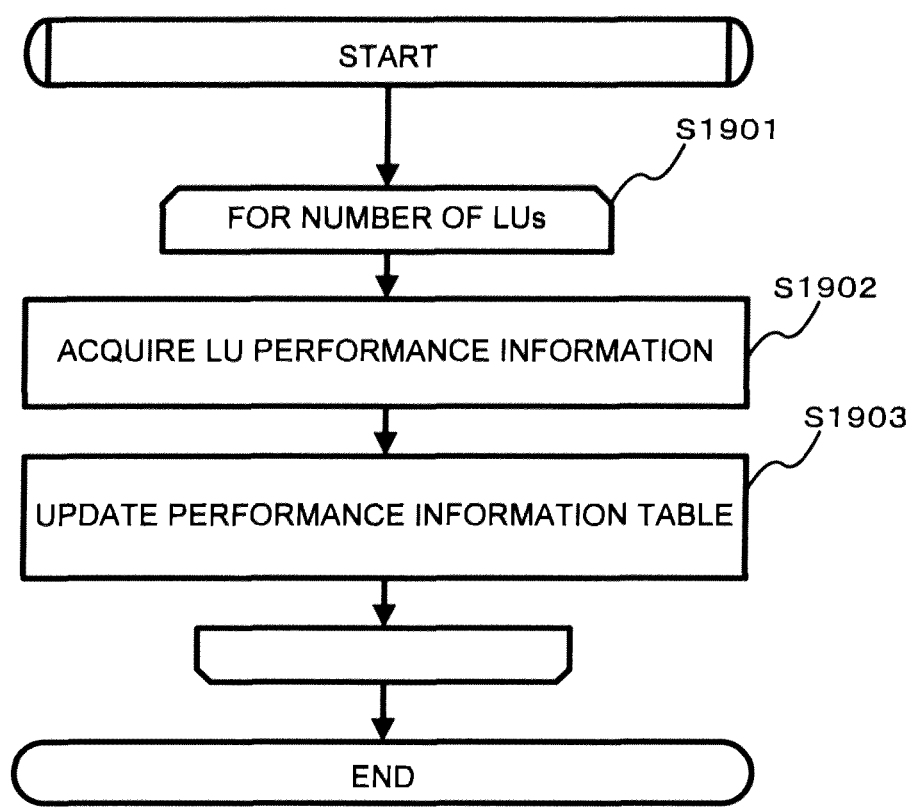
FIG. 19 is a flowchart of the processing for acquiring LU performance.

FIG. 19 is a flowchart of the LU performance acquisition process.

The performance acquisition program carries out S1902 and S1903 for each LU of the storage apparatus 2. S1902 and S1903 will be explained hereinbelow by taking a single LU as an example (will be called the "target LU" in the explanation of FIG. 19).

In S1902, the performance acquisition program acquires the performance information of the target LU 900. Specifically, for example, the performance acquisition program acquires from the storage apparatus 2 the target LU 900 performance information (IOPS and response time). The LU performance information may be acquired from the storage apparatus 2 asynchronously with respect to the LU regular distribution process, and the acquired performance information of each LU may be stored in the storage resource 42 of the storage management server 4. In this case, the target LU 900 performance information may be acquired from the storage resource 42 of the storage management server 4 in this S1902.

Figure 20:
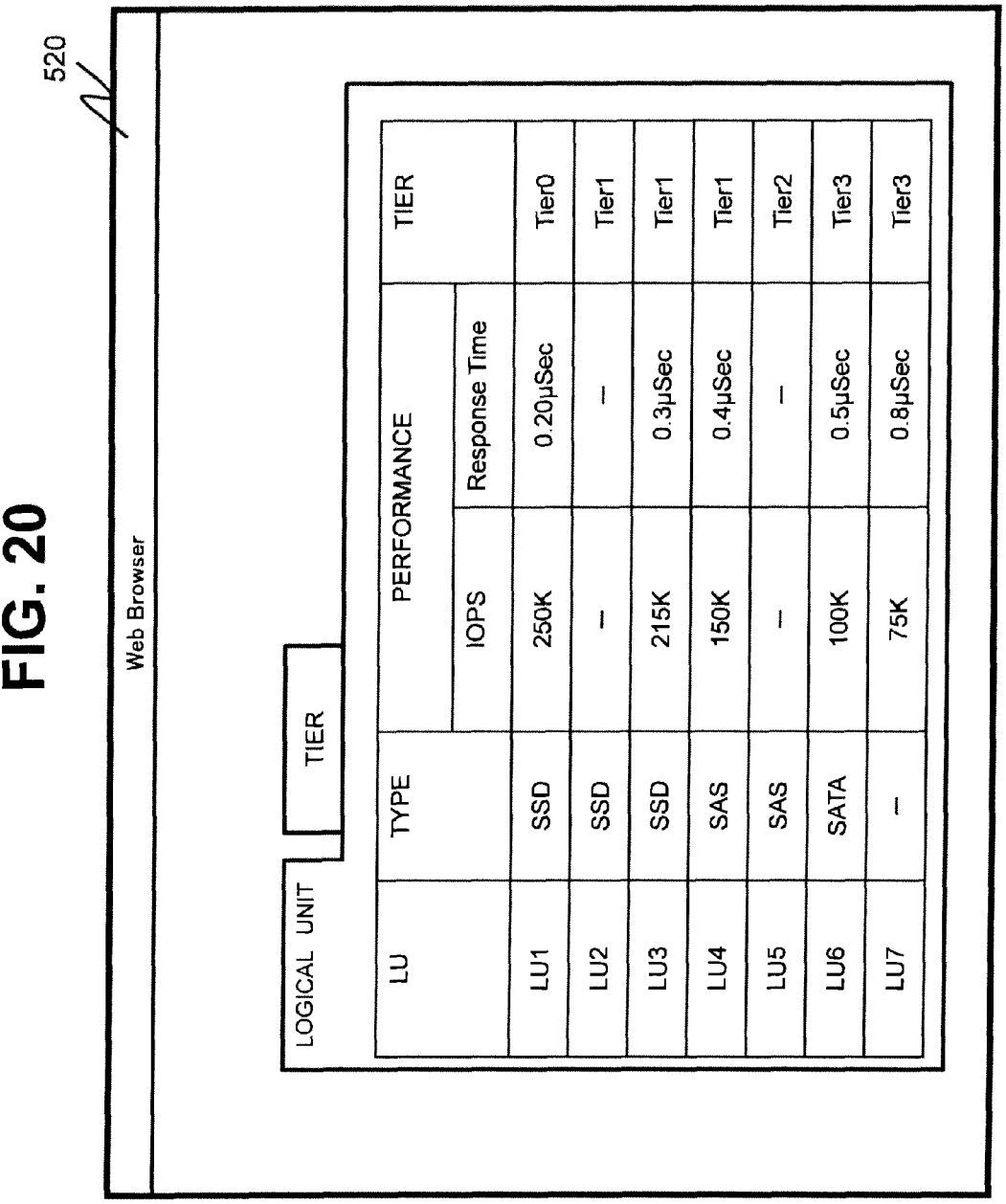
FIG. 20 shows an LU performance confirmation screen.

In S1903, the performance acquisition program registers a performance measurement value (a value denoting the acquired performance information) in the performance information table 4350. For example, in a case where the performance information of target LU "LU 1" has been acquired in S1902, the performance acquisition program registers "250 k" as the IOPS 4352 of LU 1, and registers "0.20 μSec" as the response time 4353 of the LU 1 (refer to FIG. 11). Furthermore, as shown in FIG. 11, there may be cases where there are LUs, like LU 2 and LU 7, for which performance information is unacquirable. A LU for which performance information is unacquirable is a LU for which an I/O has not been generated even one time. Furthermore, in a case where the administrator wished to check the performance of a LU 900, the performance acquisition program is able to display on the display computer 5 a screen (refer to FIG. 20) for displaying information that conforms to the LU type table 4330, the LU tier table 4340, and the performance information table 4350.

In accordance with the LU performance acquisition process described hereinabove, it is possible to acquire information denoting the actual performance of each LU 900 at each monitoring time that the administrator has configured in the initial settings screen 510.

Figure 21:
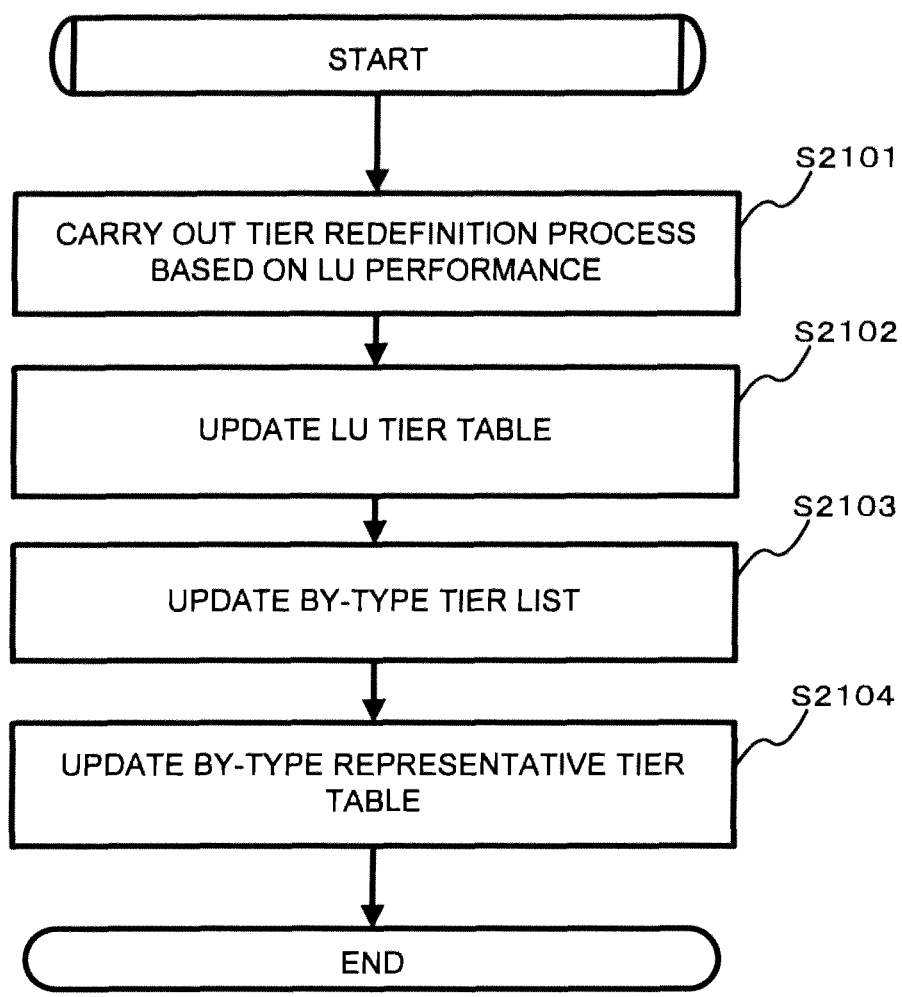
FIG. 21 is a flowchart of the processing (the processing of S1802 of FIG. 18) for distributing LUs for which performance has been acquired.
Figure 23:
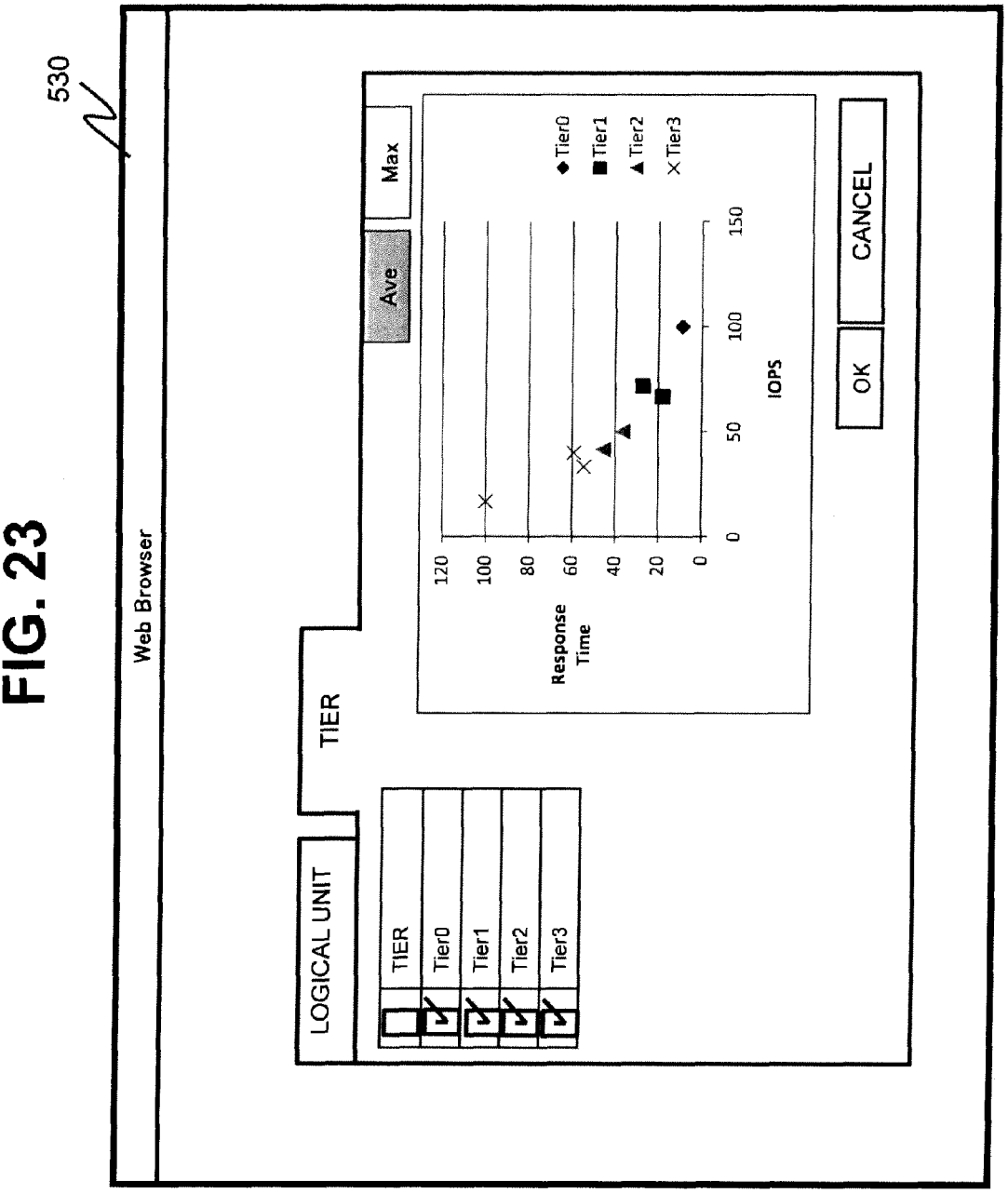
FIG. 23 shows a screen denoting the result of the redefining of a tier based on LU performance.

Next, a performance-acquired LU distribution process (the processing of S1802 of FIG. 18) will be explained. FIG. 21 is a flowchart of a performance-acquired LU distribution process. FIG. 22 is a schematic diagram of a LU performance-based tier redefinition. FIG. 23 shows a screen denoting the result of a LU performance-based tier redefinition.

In S2101, the addition program 4240 carries out a LU performance-based tier redefinition process. Specifically, for example, the addition program 4240 groups multiple LUs into multiple tiers based on the performance of each LU shown in the performance information table 4350, and the configured allowable tier range and maximum number of tiers (refer to FIG. 14). According to a more specific example, as shown in FIG. 22, the addition program 4240 carries out cluster analysis based on the performance (IOPS and response time) of each LU and the allowable tier range and maximum number of tiers (refer to FIG. 14). That is, the addition program 4240 normalizes the IOPS and response time of each LU performance, and, in addition, delimits the distance from (IOPS, response time)=(100, 0) into a N sub-distance based on (A) and (B) below:
(A) the distance between (IOPS, response time)=(100, 0) and the (TOPS, response time) of each LU; and
(B) the allowable tier range and the maximum number of tiers. N is an integer of equal to or larger than 2, and is equal to or less than the maximum number of tiers. The maximum value of the sub-distance is equal to or less than the allowable tier range. N tiers correspond on a one-to-one basis with the N sub-distances. The level of the tier becomes higher as a sub-distance to which the tier corresponds becomes closer to (IOPS, response time)=(100, 0). This conforms to the notion that performance is at its highest when the IOPS value is "100" and the response time value is "0". In this embodiment, cluster analysis is employed as the method for a tier redefinition process based on LU performance, but a method other than cluster analysis may be used.

Furthermore, the addition program 4240, as shown in FIG. 23, is able to display on the display computer 5 a screen 530 that displays information denoting the result of the LU performance-based tier redefinition process. A graph that represents the IOPS along the horizontal axis and the response time along the vertical axis is displayed in the screen 530. Points denoting LUs are plotted in this graph, and the location of a point accords with the TOPS and response time of this LU. Only the point of a LU, which belongs to a tier specified by the administrator (for example, a tier for which a checkmark has been placed in the checkbox) is displayed. Furthermore, the screen 530 can receive a specification as to whether the response time is an average response time or a maximum response time. In a case where an average response time has been specified, the vertical axis is the average response time, and in a case where the maximum response time has been specified, the vertical axis represents the maximum response time. The locations of the LU points will differ in accordance with which type of response time has been specified.

In S2102, the addition program 4240 updates the LU tier table 4340 based on the result of the tier redefinition process of S2101. Specifically, for example, the addition program 4240, in a case where the LU tier was Tier 1, but this LU tier became Tier 2 in accordance with the tier redefinition process, registers "Tier 2" as the tier 4342 of this LU in the LU tier table 4340.

Figure 24:
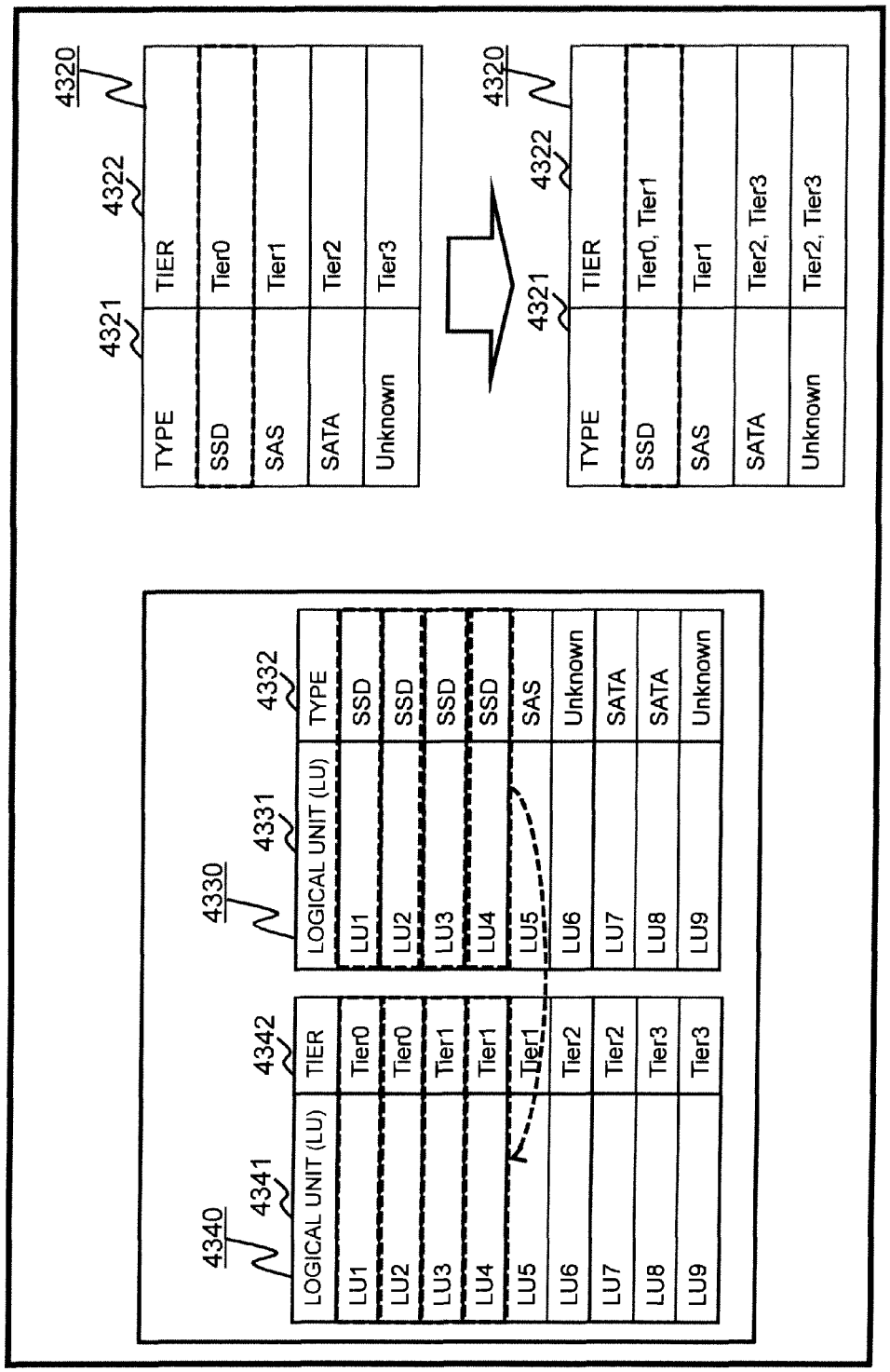
FIG. 24 is a schematic diagram of a process for updating the by-type tier list 4320.

In S2103, the addition program 4240 carries out update processing of the by-type tier list 4320. FIG. 24 is a schematic diagram of the by-type tier list 4320 update process.

The addition program 4240 updates the by-type tier list 4320 based on the LU tier table 4340 that was updated in S2102, and the LU type table 4330. S2101 will be explained below by taking a single LU type as an example (will be called the "target type" in this paragraph) (the following processing is performed for each LU type). For example, the addition program 4240 identifies target types of all the LUs from the LU type table 4330, and identifies the tier of each identified LU from the LU tier table 4330. Then, the addition program 4240 registers information denoting all the tiers corresponding to the target type in the by-type tier list 4320. According to the example of FIG. 24, LU 1, LU 2, LU 3 and LU 4 are identified as LUs corresponding to the target-type "SSD". The addition program 4240 identifies Tier 0 and Tier 1 from the LU tier table 4340 as the tiers corresponding to the LUs 1 through 4. The addition program 4240 registers "Tier 0" and "Tier 1" in the by-type tier list 4320 as the tiers 4322 corresponding to the target-type "SSD".

Figure 25:
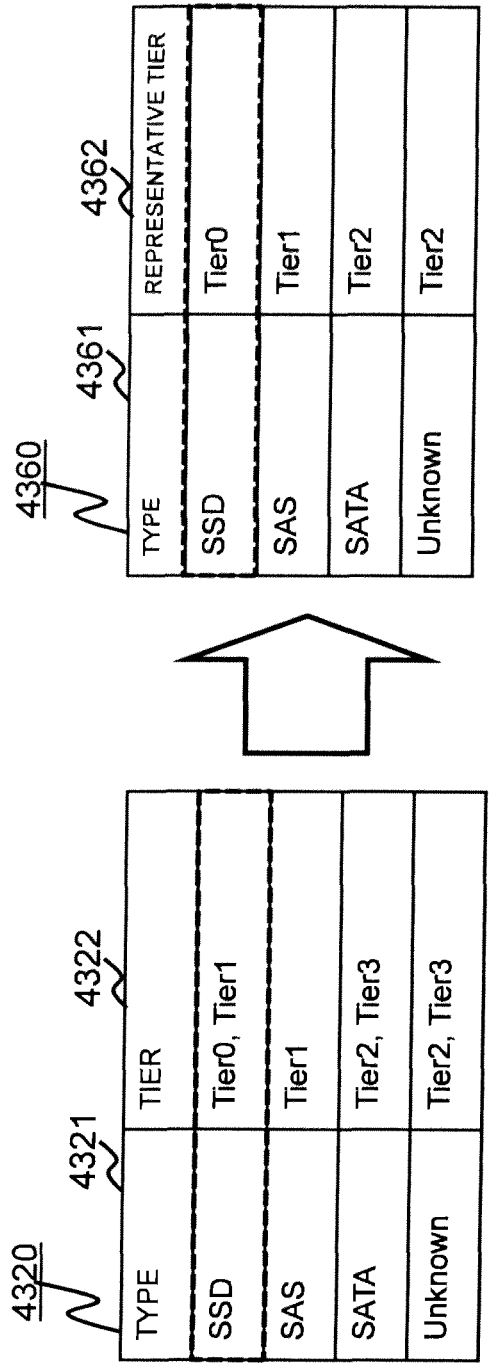
FIG. 25 is a schematic diagram of a process for updating the by-type representative tier table 4360.

In S2104, the addition program 4240 carries out update processing of the by-type representative tier table 4360. FIG. 25 is a schematic diagram of the update processing of the by-type representative tier table 4360.

The addition program 4240 updates the by-type representative tier table 4360 based on the by-type tier list 4320. In a case where a LU type corresponds to multiple tiers as was explained using FIG. 12, information denoting the highest level tier of these multiple tiers (in the example shown in the drawing, the tier having the smallest tier number) is registered in the by-type tier list 4320 as the representative tier 4362. According to the example of FIG. 25, since "Tier 0" and "Tier 1" are in the by-type tier list 4320 as the tiers corresponding to the type "SSD", "Tier 0" is registered in the by-type representative tier table 4360 as the representative tier corresponding to the type "SSD".

Figure 26:
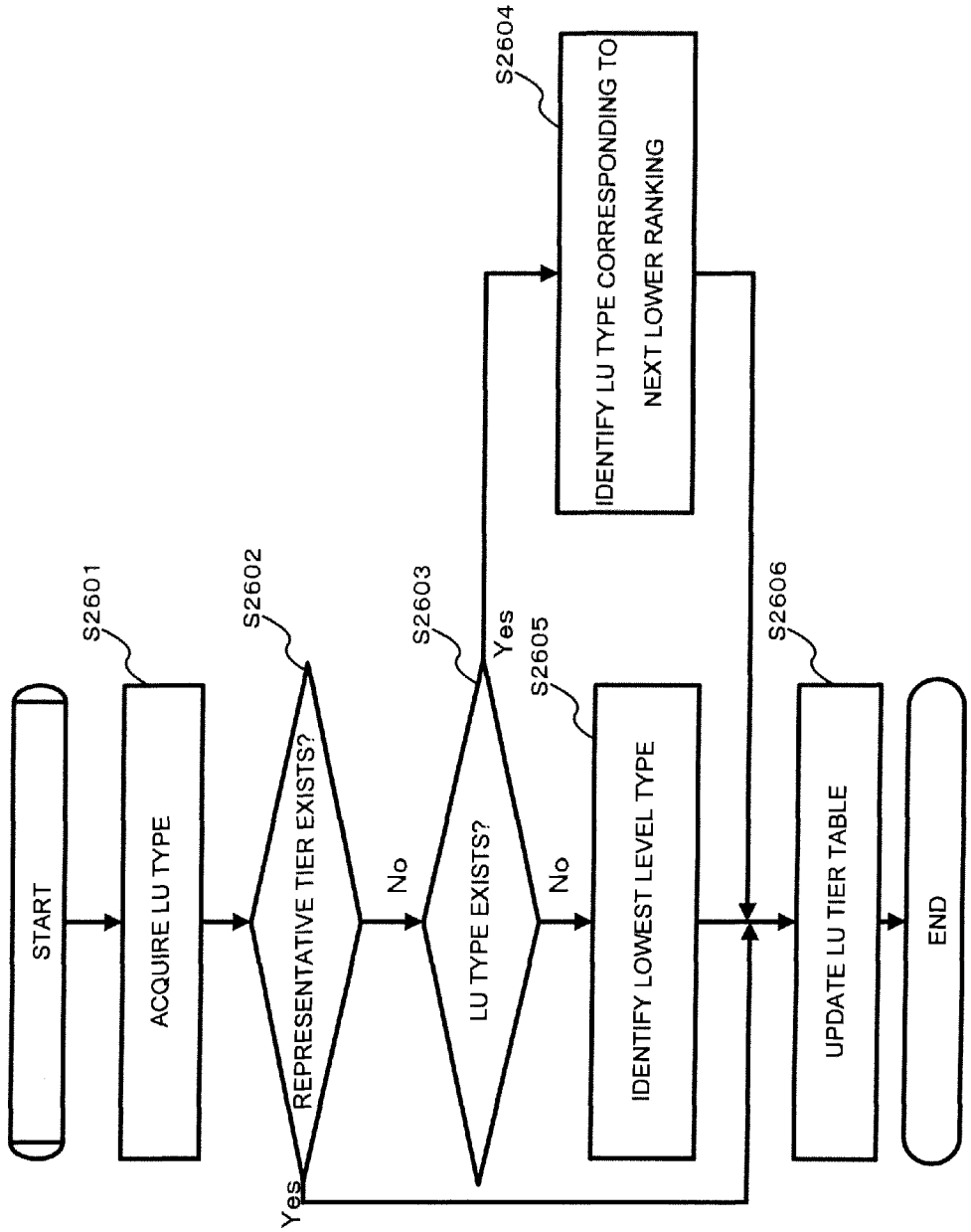
FIG. 26 is a flowchart of the processing (the processing of S1803 of FIG. 18) for distributing LUs for which performance has not been acquired.
Figure 27:
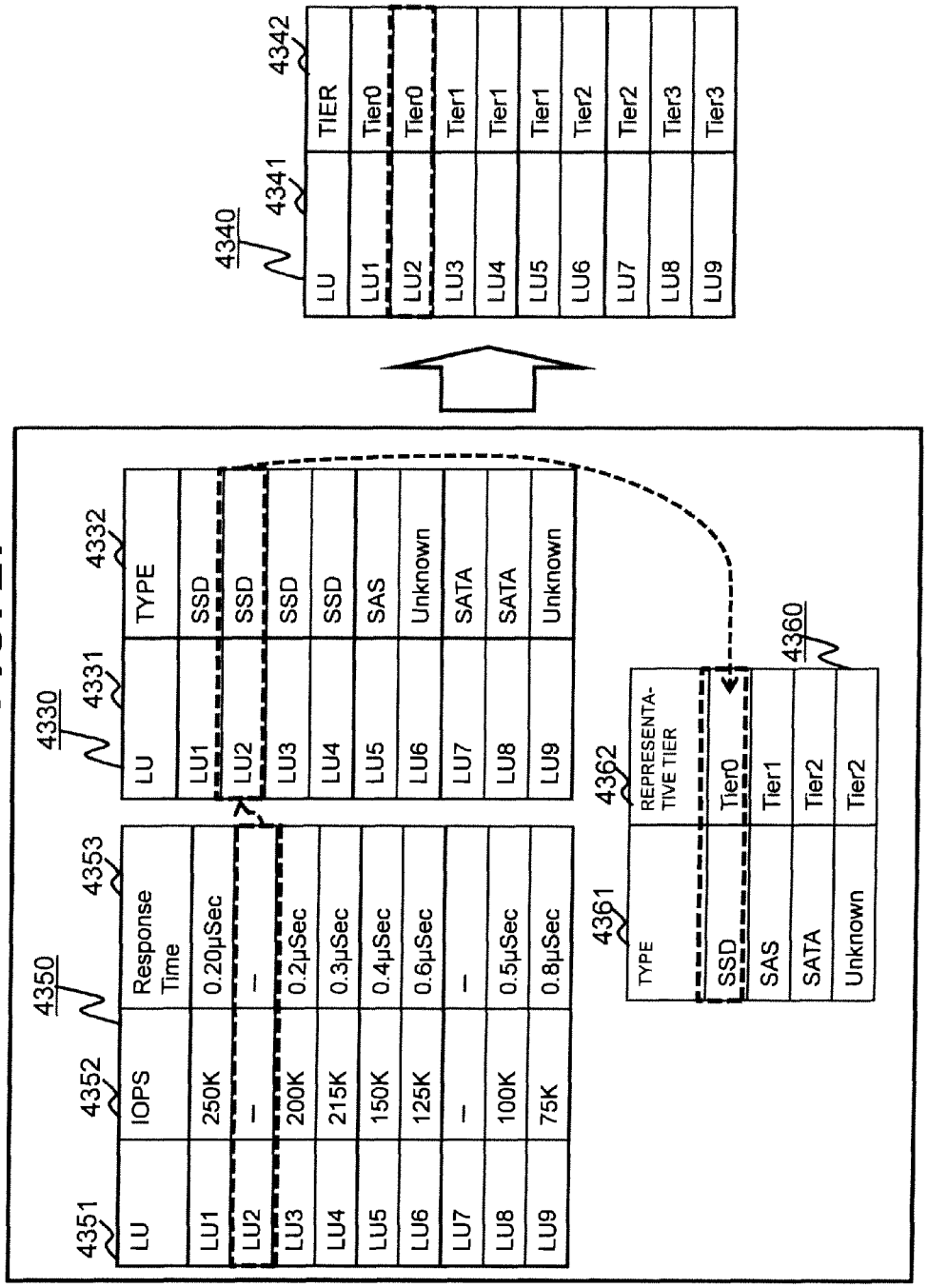
FIG. 27 is a schematic diagram of a first tier redefinition process that is not based on LU performance.

Next, a performance-not-acquired LU distribution process (the processing of S1803 of FIG. 18) will be explained. FIG. 26 is a flowchart of the performance-not-acquired LU distribution process. FIG. 27 is a schematic diagram of a first tier redefinition process that is not based on the LU performance. FIG. 28 is a schematic diagram of a second tier redefinition process that is not based on the LU performance. Furthermore, in the explanation that refers to FIGS. 26 through 28, the LU for which the LU performance is not known will be called the "target LU".

In S2601, the addition program 4240 identifies the target LU from the performance information table 4350, and identifies the type corresponding to the target LU from the LU type table 4330. According to the example of FIG. 27, the target LU is LU 2, and the type corresponding to the target LU is "SSD".

In S2602, the addition program 4240 determines whether or not the type identified in S2601 is in the by-type representative tier table 4360. In a case where the result of this determination is affirmative, S2606 is carried out next. In a case where the result of this determination is negative, S2603 is carried out next.

The processing carried out in a case where the result of the determination in S2602 is affirmative will be explained based on the example of FIG. 27.

The addition program 4240 updates the LU tier table 4340 using the acquired LU type "SSD" (S2606). In the example shown in the drawing, the addition program 4240 registers representative tier "Tier 0" corresponding to the type "SSD" in the LU tier table 4340 as the tier 4342 corresponding to the "LU 2".

In this way, in a case where the result of the determination in S2602 is affirmative, the addition program 4240 distributes the target LU 900 to the representative tier based on the by-type representative tier table 4360. Therefore, in a case where there are multiple tiers that correspond to the type of the target LU, the target LU is distributed to the highest level tier. This is because in most cases a LU 900 for which the performance has not been measured yet is a newly added LU 900. For example, in a case where an old LU and a new LU (for example, a LU that has just been added) are inside the storage apparatus 2, even when the type of the physical storage device that is the basis of the old LU is the same as the type of the physical storage device that is the basis of the new LU, the model of the physical storage device that is the basis of the new LU will be newer than the model of the physical storage device that is the basis of the old LU. A newer model is more likely to have higher performance. For this reason, distributing a LU 900 whose performance has not been measured to the representative tier corresponding to the type of this LU increases the probability of being able to minimize the difference between the actual performance of this LU and the performance suitable for the distribution-destination tier.

Next, the processing carried out in a case where the result of the determination in S2602 is negative will be explained.

In S2603, the addition program 4240 determines whether or not the LU type acquired in S2601 is on the by-type performance ranking list 4310. In a case where the result of this determination is affirmative, S2604 is carried out next. In a case where the result of this determination is negative, S2606 is carried out next.

The processing (the third tier definition process) carried out in a case where the result of the determination in S2603 is affirmation will be explained based on FIG. 28. Furthermore, it is supposed here that the target LU is "LU 10".

In S2604, the addition program 4240 identifies from the by-type performance ranking list 4310 the type "SATA" corresponding to the next lower ranking with respect to the ranking of the type (the type identified in S2601) "SAS" corresponding to the target LU "LU 10". Next, in S2606, the addition program 4240 identifies, from the by-type representative tier table 4360, the representative tier "Tier 2" corresponding to the LU type "SATA" acquired in S2604, and registers the identified representative tier "Tier 2" in the LU tier table 4340 as the tier 4340 corresponding to the target LU "LU 10".

In this way, even though there is no representative tier corresponding to the target LU type, in a case where the LU type corresponding to the target LU is on the by-type performance ranking list 4310, the target LU is distributed to the representative tier corresponding to the type having the next lower ranking with respect to the ranking of the target LU type. The target LU may be distributed to the representative tier corresponding to the type having the next lower ranking with respect to the ranking of the target LU type. According to the by-type performance ranking list 4310 related to this embodiment, the type "Unknown" is associated with the lowest ranking. For this reason, since at least the lowest level representative tier corresponding to the type "Unknown" is identified in a case where the target LU is distributed to the representative tier corresponding to the type having the next lower ranking with respect to the ranking of the target LU type, all the LUs whose performance have not been measured can be expected to be distributed suitably to any tier.

Now then, the processing (the fourth tier definition process) that is carried out in a case where the result of the determination in S2603 is negative will be explained based on FIG. 28. In S2605, the addition program 4240 identifies the type "Unknown" corresponding to the lowest ranking from the by-type performance ranking list 4310, and identifies the representative tier "Tier 2" corresponding to the type "Unknown" from the by-type representative tier table 4360. The regular program registers "Tier 2" in the LU tier table 4340 as the tier 4342 corresponding to the target LU.

This makes it possible to identify the distribution-destination tier of the target LU even in a case where the target LU type is not on the by-type performance ranking list 4310.

Next, the additional tier definition process will be explained. FIG. 29 is a flowchart of the additional tier definition process. This process is basically the same as the process shown in FIG. 26.

In S2901, the addition program 4220 refers to the LU type table 4330, and identifies the type of the added LU.

In S2902, the addition program 4220 determines whether or not the type identified in S2901 is in the by-type representative tier table 4360. In a case where the result of this determination is affirmative, S2906 is carried out next. In a case where the result of this determination is negative, S2903 is carried out next.

The processing carried out in a case where the result of the determination in S2902 is affirmative will be explained.

The addition program upgrades the LU tier table 4340 using the identified LU type. Specifically, for example, the addition program 4220 identifies the representative tier corresponding to the added LU type from the by-type representative tier table 4360, and registers information denoting the identified representative tier in the LU tier table 4340 as the tier 4342 corresponding to the added LU (S2906).

Next, the processing carried out in a case where the result of the determination in S2902 is negative will be explained.

In S2903, the addition program 4220 determines whether or not the LU type acquired in S2901 is on the by-type performance ranking list 4310. In a case where the result of this determination is affirmative, S2904 is carried out next. In a case where the result of this determination is negative, S2906 is carried out next.

The processing carried out in a case where the result of the determination in S2903 is affirmative will be explained. In S2904, the addition program 4220 identifies the type corresponding to the next lower ranking with respect to the ranking of the added LU type from the by-type performance ranking list 4310. Then, in S2906, the addition program 4220 identifies the representative tier corresponding to this identified type from the by-type representative tier table 4360, and registers information denoting this identified representative tier in the LU tier table 4340 as the tier 4342 corresponding to the added LU.

The processing carried out in a case where the result of the determination in S2903 is negative will be explained. In S2905, the addition program 4220 identifies the type "Unknown" corresponding to the lowest ranking from the by-type performance ranking list 4310. Then, in S2906, the addition program 4220 identifies the representative tier corresponding to this identified type from the by-type representative tier table 4360, and registers information denoting this identified representative tier in the LU tier table 4340 as the tier 4342 corresponding to the added LU.

According to the above additional tier definition process, it is possible to distribute an added LU whose performance has not been measured yet to the appropriate tier.

The embodiment of the present invention described hereinabove is an example for explaining the present invention, and does not purport to limit the scope of the present invention to this embodiment alone. The present invention can be put into practice in various other modes without departing from the gist thereof.

For example, in either a volume migration or a page migration, information denoting a migration-destination LU, information denoting a migration-destination tier, or information denoting a migration-destination RAID group may be specified as the migration destination.

REFERENCE SIGNS LIST

1 Business server
2 Storage apparatus
3 External storage apparatus
4 Storage management server
5 Display computer

The invention claimed is:

1. A method for distributing a storage device among multiple storage devices to any of multiple tiers in a storage apparatus, the method comprising the steps performed by one or more computers of:
  (a) distributing the storage device among the multiple storage devices of the storage apparatus to a tier among the multiple tiers based on a storage device type of the storage device and type/tier information that denotes a corresponding relationship between multiple storage device types and the multiple tiers;
  (b) acquiring, subsequent to the (a) step, performance information denoting a performance of the storage device;
  (c) when the performance information of the storage device is acquired, distributing the storage device to a tier among the multiple tiers based on the performance information of the storage device; and
  (d) when the performance information of the storage device is not acquired, determining a presence or absence of a representative tier corresponding to the storage device type of the storage device,
  wherein the (d) step further comprises:
    (d1) when the representative tier corresponding to the storage device type of the storage device is present, distributing the storage device to the representative tier; and
    (d2) when the representative tier corresponding to the storage device type of the storage device is not present,
      (d2-1) determining a ranking corresponding to the storage device type of the storage device registered in type/ranking information, wherein the type/ranking information denotes a corresponding relationship between multiple storage device types and rankings;
      (d2-2) selecting, based on the type/ranking information, a storage device type of another ranking that differs from the ranking corresponding to the storage device type of the storage device;
      (d2-3) identifying a representative tier corresponding to the storage device type selected in the (d2-2) step; and
      (d2-4) distributing the storage device to the representative tier identified in the (d2-3) step.

2. A method according to claim 1, further comprising the steps of:
(p) receiving a specification for a migration-source storage device and a migration-destination tier; and
(q) identifying a storage device that has been distributed to the specified migration-destination tier from device/tier information denoting a corresponding relationship between the multiple storage devices and the multiple tiers, and sending a migration instruction specifying the identified storage device and the specified migration-source storage device to the storage apparatus.

3. A method according to claim 2, wherein a maximum value of a performance difference of two or more storage devices distributed to the same tier is equal to or less than a value specified by an administrator.

4. A method according to claim 3, wherein, in a case where a storage device is newly added, this added storage device is distributed to any of the multiple tiers based on the type of this added storage device.

5. A method according to claim 4, wherein the multiple storage devices comprise a storage device for which performance information is not acquired in the (b), the method further comprising the steps of:
(e) identifying a storage device type corresponding to two or more tiers based on device/type information denoting the corresponding relationship between the multiple storage devices and the multiple tiers in accordance with a result of the (c) step, and the corresponding relationship between the multiple storage devices and the multiple storage device types;
(f) selecting a representative tier, which is one tier of two or more tiers corresponding to the storage device type identified in the (e) step; and
(g) carrying out distribution to the representative tier selected in the (f) based on the type of the storage device for which performance information has not been acquired in the (b) step.

6. A method according to claim 5, wherein the performance of the storage device is a frequency of I/O (Input/Output) with respect to the storage device and a response time of the storage device, and
in the (c) step, the level of a tier becomes higher as a performance range to which the tier corresponds becomes closer to a performance expressed by a maximum value of the I/O frequency and a minimum value of the response time.

7. A method according to claim 6, wherein the performance of the storage device is measured by issuing, from a host of the storage apparatus, an I/O command specifying a storage device, and
the performance information of the storage device is information denoting measured performance.

8. A management system, which manages a storage apparatus that exercises control so as to arrange data in a storage device of a certain tier of multiple tiers, comprising:
a communication interface apparatus, which is coupled to the storage apparatus;
a storage resource for storing type/tier information denoting a corresponding relationship between multiple storage device types and multiple tiers; and
a processor, which is coupled to the communication interface apparatus and the storage resource,
wherein the processor is configured to:
(a) indicate an allowable tier range, which denotes a predetermined range of performance differences of multiple storage devices in a single tier;
(b) carry out a first tier definition process for distributing multiple storage devices of the storage apparatus to multiple tiers based on respective storage device types of the multiple storage devices and the type/tier information;
(c) acquire, subsequent to the first tier definition process, performance information denoting a performance of a storage device for each of the multiple storage devices; and
(d) carry out a second tier definition process for distributing the multiple storage devices to the multiple tiers based on performance information of the multiple storage devices such that two or more storage devices of similar performance are distributed to the same tier, wherein the performance differences of the multiple storage devices in the same tier is limited within the allowable tier range.

9. A management system according to claim 8, wherein the multiple storage devices comprise a target storage device, which is either a storage device for which performance information is not acquired in the (c) or a newly added storage device, and
the processor is configured to:
(e) identify a storage device type corresponding to two or more tiers based on device/type information denoting the corresponding relationship between the multiple storage devices and the multiple tiers in accordance with a result of the second tier definition process, and the corresponding relationship between the multiple storage devices and the multiple storage device types;
(f) select a representative tier, which is one tier of two or more tiers corresponding to the storage device type identified in the (e); and
(g) distribute the target storage device to any of the multiple tiers in accordance with the presence or absence of a representative tier corresponding to the type of the target storage device.

10. A management system according to claim 9, wherein, in a case where there is a representative tier corresponding to the type of the target storage device in the (g), the processor is configured to distribute the target storage device to the representative tier.

11. A management system according to claim 9, wherein the storage resource stores type/ranking information denoting a corresponding relationship between multiple storage device types and rankings, and
in a case where there is no representative tier corresponding to the type of the target storage device in the (g), the processor is configured to:
(g1) determine whether or not a ranking corresponding to the type of the target storage device is registered in the type/ranking information;
(g2) in a case where a result of this determination is affirmative, select, based on the type/ranking information, a type of a ranking that differs from the ranking corresponding to the type of the target storage device;
(g3) identify a representative tier corresponding to the type selected in the (f2); and
(g4) distributes distribute the target storage device to the representative tier identified in the (g3).

12. A management system according to claim 11, wherein the different ranking in the (g2) is the next lower ranking with respect to the ranking corresponding to the type of the target storage device.

13. A management system according to claim 9, wherein the storage resource stores type/ranking information denoting a corresponding relationship between multiple storage device types and rankings, and in a case where there is no representative tier corresponding to the type of the target storage device in the (g), the processor is configured to:
- (g1) determine whether or not a ranking corresponding to the type of the target storage device is registered in the type/ranking information;
- (g2) in a case where a result of this determination is negative, identify the type corresponding to the lowest ranking from the type/ranking information;
- (g3) identify a representative tier corresponding to the type selected in the (g2); and
- (g4) distributes distribute the target storage device to the representative tier identified in the (g3).

14. A management system according to claim 9, wherein the representative tier selected in the (f) is the highest-level tier of the two or more tiers.

15. A non-transitory computer readable medium having machine instructions stored therein, the instructions being executed by a computer for managing a storage apparatus that exercises control so as to arrange data in a storage device of a certain tier of multiple tiers, causing the computer to perform operations comprising:
- (a) carrying out a first tier definition process for distributing multiple storage devices of the storage apparatus to multiple tiers based on respective storage device types of the multiple storage devices and type/tier information that denotes a corresponding relationship between multiple storage device types and multiple tiers;
- (b) acquiring, subsequent to the first tier definition process, performance information denoting a performance of a storage device for each of the multiple storage devices; and
- (c) carrying out a second tier definition process for distributing the multiple storage devices to the multiple tiers based on the performance information of the multiple storage devices such that two or more storage devices of similar performance are distributed to the same tier, wherein the (c) step further comprises:
  - normalizing the performance information of each of the multiple storage devices; and
  - defining tiers based at least in part on distances between each of the normalized performance information of the multiple storage devices and the performance information of a storage device with good performance.

16. The non-transitory computer readable medium according to claim 15, wherein the performance of the storage device is a frequency of I/O (Input/Output) with respect to the storage device and a response time of the storage device, and
in the (c), the level of a tier becomes higher as a performance range to which the tier corresponds becomes closer to a performance expressed by a maximum value of the I/O frequency and a minimum value of the response time.

17. The non-transitory computer readable medium according to claim 16, wherein the performance of the storage device is measured by issuing, from a host of the storage apparatus, an I/O command specifying a storage device, and
the performance information of the storage device is information denoting measured performance.

18. The non-transitory computer readable medium according to claim 15, further comprising instructions that when executed by the computer, causing the computer to perform operations comprising:
- (d) receiving a specification for a migration-source storage device and a migration-destination tier; and
- (e) identifying a storage device that has been distributed to the specified migration-destination tier from device/tier information denoting a corresponding relationship between the multiple storage devices and the multiple tiers, and sending a migration instruction specifying the identified storage device and the specified migration-source storage device to the storage apparatus.

19. The non-transitory computer readable medium according to claim 15, wherein a maximum value of a performance difference of two or more storage devices distributed to the same tier is equal to or less than a value specified by an administrator.

20. The non-transitory computer readable medium according to claim 19, wherein, in a case where a storage device is newly added, this added storage device is distributed to any of the multiple tiers based on the storage device type of the added storage device.

* * * * *